(12) United States Patent
Fujioka

(10) Patent No.: US 7,379,622 B2
(45) Date of Patent: *May 27, 2008

(54) INFORMATION-INPUTTING DEVICE INPUTTING CONTACT POINT OF OBJECT ON RECORDING SURFACES AS INFORMATION

(75) Inventor: Susumu Fujioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/976,990

(22) Filed: Nov. 1, 2004

(65) Prior Publication Data

US 2005/0084177 A1    Apr. 21, 2005

Related U.S. Application Data

(62) Division of application No. 09/742,063, filed on Dec. 22, 2000, now Pat. No. 6,829,372.

(30) Foreign Application Priority Data

Dec. 27, 1999   (JP)   ................................. 11-369699

(51) Int. Cl.
G06K 9/00   (2006.01)

(52) U.S. Cl. ..................... 382/291; 382/103; 356/622

(58) Field of Classification Search ............... 382/103, 382/106, 107, 123, 159, 168, 180, 199, 214, 382/218, 243, 282, 291–299, 115; 702/153, 702/43; 342/435; 370/329; 715/500.1; 356/608, 622

See application file for complete search history.

(56) References Cited

U.S. PATENT DOCUMENTS

| | | | | |
|---|---|---|---|---|
| 4,217,649 A | * | 8/1980 | Doundoulakis | .............. 702/43 |
| 5,745,591 A | * | 4/1998 | Feldman | ...................... 382/115 |
| 5,825,666 A | * | 10/1998 | Freifeld | ...................... 702/153 |
| 6,144,375 A | * | 11/2000 | Jain et al. | ................ 715/500.1 |
| 6,236,736 B1 | * | 5/2001 | Crabtree et al. | ............ 382/103 |
| 6,531,959 B1 | * | 3/2003 | Nagaoka et al. | ............ 340/435 |
| 6,556,307 B1 | * | 4/2003 | Norita et al. | ............... 356/608 |
| 6,590,877 B1 | * | 7/2003 | Yamakita | .................... 370/329 |
| 6,614,932 B1 | * | 9/2003 | Iwane | ........................ 382/218 |
| 6,674,424 B1 | | 1/2004 | Fujioka | |
| 6,829,372 B2 | * | 12/2004 | Fujioka | ...................... 382/103 |
| 2002/0126161 A1 | | 9/2002 | Kuzunuki et al. | |

FOREIGN PATENT DOCUMENTS

| | | |
|---|---|---|
| JP | 06-266498 | 9/1994 |
| JP | 6-289989 | 10/1994 |
| JP | 07-044650 | 2/1995 |
| JP | 8-16931 | 2/1996 |
| JP | 08-286809 | 11/1996 |
| JP | 8-315152 | 11/1996 |
| JP | 09-091083 | 4/1997 |
| JP | 10-078844 | 3/1998 |

* cited by examiner

Primary Examiner—Seyed Azarian
(74) Attorney, Agent, or Firm—Oblon, Spivak, McClelland, Maier & Neustadt, P.C.

(57) ABSTRACT

An information-inputting device is provided, which includes a plurality of photographing units photographing an area on a plane. An object located on the plane is then extracted from an image that includes the plane and the object, and it is determined whether the object is a specific object. If the object is the specific object, a position of a contact point between the specific object and the plane is calculated.

15 Claims, 35 Drawing Sheets

IMAGE-FORMED LOCATION OF CONTACT POINT A

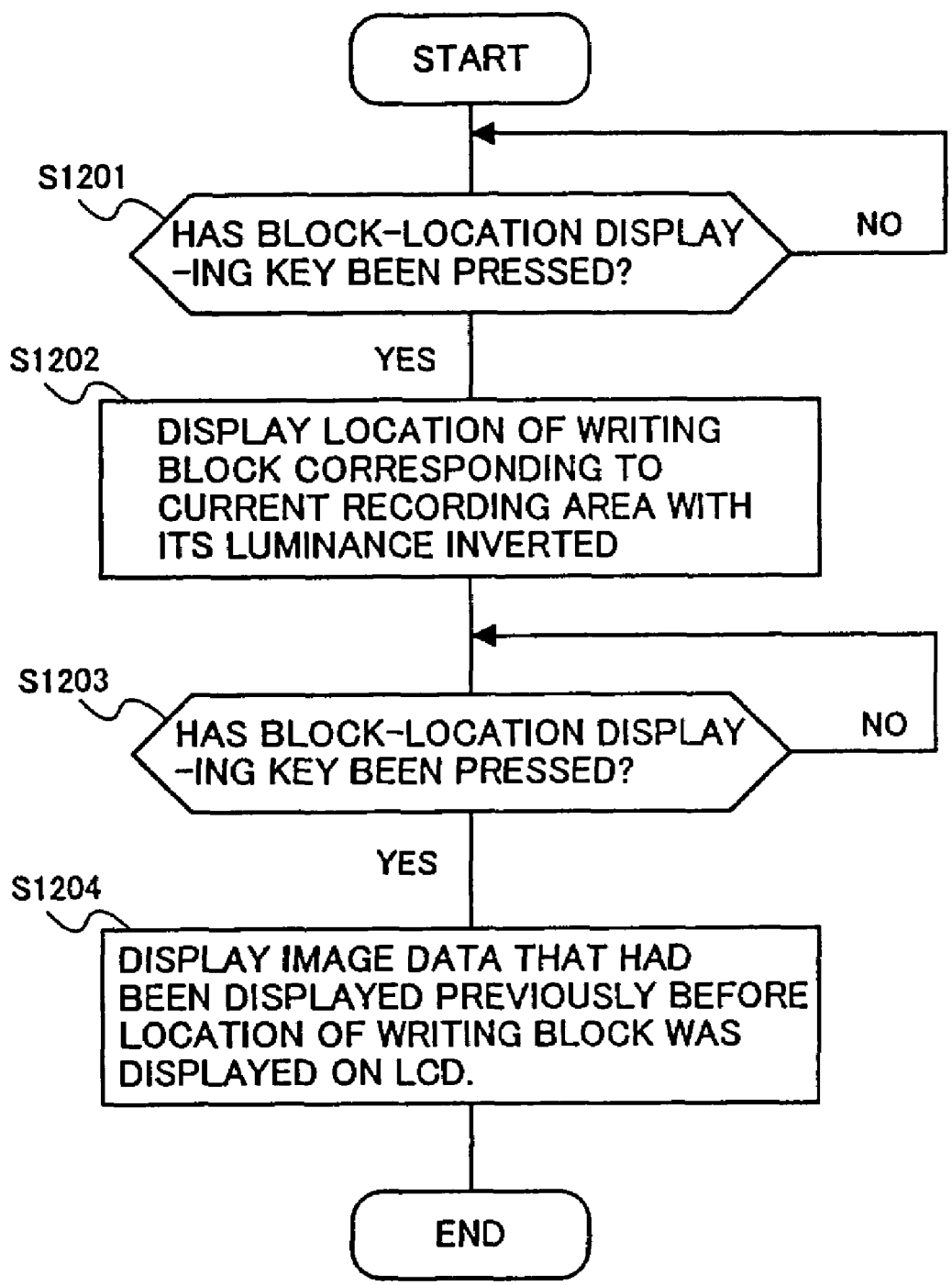

57 SITUATION IN WHICH A PAGE IS DIVIDED INTO BLOCKS

59 WRITING BLOCK

INFORMATION-INPUTTING DEVICE INPUTTING CONTACT POINT OF OBJECT ON RECORDING SURFACES AS INFORMATION

BACKGROUND OF THE INVENTION

1. Field of the Invention

The present invention relates to an information-inputting device that can record data in a recording medium in real time while the data is being written on a recording surface without specifying types of writing implements and materials used for the recording surface.

2. Description of the Related Art

Methods and apparatuses for inputting information have been proposed, and have been put to practical use. For instance, Japanese Laid-open Patent Application No. 6-289989 discloses an information recognition device. The information recognition device provides a camera on one side of a recording surface. The information recognition device detects coordinates of each position of information recorded by a writing implement on the recording surface, for example, a track of letters written on recording paper, and develops depiction data based on the coordinates. The information recognition device alternatively detects coordinates of each position of a writing implement, that is, coordinates of a tip of the writing implement, and develops depiction data based on the coordinates. To recognize the information recorded on the recording surface, the information recognition device also needs to detect the origin of the coordinates on the recording surface by detecting corners of the recording paper, that is, the recording surface, and the origin of the X-axis and the Y-axis recorded on the recording paper.

The information recognition device must detect the corners of the recording paper or the origin of the coordinates based on the information recorded on the recording paper before detecting the coordinates of each position of the information every time the recording paper is exchanged. Additionally, in a case that a position of the recording paper is moved from its original position while recording the information on the recording paper, or in a case that positions of the corners of the recording paper in an image being taken by the camera are moved, coordinates of recording the information on the recording paper are detected by the camera as different coordinates from what they are supposed to be, since the coordinates of recording the information are calculated based on the origin of the coordinates. Consequently, the camera detects different information from what a user intends to record unless a moved origin of the coordinates is detected.

Additionally, when the camera photographs the information recorded on the recording paper from an upper oblique direction of the recording paper, error between actual coordinates of the information recorded on the recording paper and coordinates detected by the camera increases as a distance between the recording paper and the camera increases. Such a problem will be described with reference to FIGS. 1A and 1B. An angle θ indicates an angle range that a fixed number of pixels provided in the vertical direction of an imaging device such as the camera can detect light through a lens. In FIG. 1A, a distance on the recording paper that the imaging device can detect with the angle θ is a distance L1. In FIG. 1B, a distance on the recording paper that the imaging device can detect with the angle θ is a distance L2. It is assumed that the distance L2 is greater than the distance L1. Accordingly, the greater the distance between the recording paper and the camera, the wider an area on the recording paper that can be detected by the camera with the angle θ. In other words, an area on the recording paper detected by each pixel that is provided in the imaging device increases as the distance between the recording paper and the camera increases. Accordingly, when the camera photographs the information recorded on the recording paper from the upper oblique direction of the recording paper, the error between the actual coordinates of the information recorded on the recording paper and the coordinates detected by the camera increases as the distance between the recording paper and the camera increases. Thus, an image detected by the camera is contracted with respect to an image corresponding to the information recorded on the recording paper.

The number of pixels provided in the imaging device necessary for obtaining image data by photographing the coordinates of each position of the information depends on a size of a recording area on the recording paper and a resolution of reading the coordinates of each position of the information recorded on the recording paper. As the size of the recording area increases, the greater the number of pixels necessary for calculating the coordinates from the image data also increases. Additionally, for a higher resolution of reading the coordinates, the number of pixels must be greater. Furthermore, a frame rate of image signals outputted from the imaging device must be high in order to clearly monitor an information recording process from the photographed image data. However, an imaging device with a large number of pixels and a high frame rate is generally expensive, and thus it is hard to hold down production cost of an information input device by mounting such an imaging device thereon. Consequently, a writing input device with a comparatively inexpensive imaging device using a smaller number of pixels has been requested.

Additionally, a size of an image-display device used in a portable writing input device for displaying the image data obtained by the camera is preferred to be small for miniaturization of the device and its electric efficiency. However, if the size of the image-display device is small, the number of pixels displayed on the image-display device becomes small, and thus quality of the image data displayed on the image-display device decreases by stretching the image data immoderately when displaying a page of the image data thereon. Furthermore, when the number of imaging devices used for photographing the information recorded on the recording paper is small, a wide-angle lens should be attached to each of the imaging devices for photographing the information. In such case, a resolution of reading the coordinates of the information recorded on the recording paper differs depending on where the information is recorded on the recording paper.

SUMMARY OF THE INVENTION

Accordingly, it is a general object of the present invention to provide an information-inputting device used for writing data on a recording surface by use of a writing implement. A more specific object of the present invention is to provide an information-inputting device, a writing input device and a portable electronic writing input device that are easily carried and are used for writing data on a desired recorded material whose surface is a plane by use of a desired writing implement. Another object of the present invention is to provide a method and an apparatus for recording data in a recording medium in real time while the data is being written on a recording surface by use of a writing implement in a case in which the writing implement is detected. Yet, another object of the present invention is to provide a method of managing written data and a recording medium for creating a page of the written data by dividing the written data into a plurality of parts and by inputting the plurality of parts by a recording area in a case in which a resolution of reading the written data in the recording area is low. Yet, another object of the present invention is to provide a method of managing written data and a recording medium for controlling a pixel density of the written data to be even throughout an entire recording area. Yet, another object of the present invention is to provide a method of controlling display of a recording area to increase operability of writing data in the recording area.

The above-described objects of the present invention are achieved by an information-inputting device including a plurality of photographing units photographing an area on a plane; an object-recognizing unit extracting an object located on the plane from a photographed image, and recognizing whether the object is a specific object; a location-calculating unit calculating a contact position of the specific object on the plane from the photographed image if the object has been recognized as the specific object; and a data-storing unit storing information about a track of the contact position while the specific object is contacting the plane.

The above-described objects of the present invention are also achieved by a method of inputting information including the steps of extracting an object located on a plane from an image that includes the plane and the object; recognizing whether the object is a specific object; and inputting a contact position of the specific object on the plane as information if the object has been recognized as the specific object.

The above-described objects of the present invention are also achieved by a writing input device including an image-inputting unit photographing a recording area on a plane by providing a plurality of electronic cameras that include imaging devices; an object-recognizing unit extracting an object located on the plane from a photographed image, and determining whether the object is a writing implement by recognizing a shape of the object; a coordinate-calculating unit calculating contact coordinates of the object on the plane based on an image of the object on an imaging device if the object has been determined as the writing implement; a data-storing unit storing a series of the contact coordinates while the object is contacting the plane; and a displaying unit creating depiction data from the series of the contact coordinates, and displaying the depiction data thereon.

The above-described objects of the present invention are also achieved by a method of managing written data in a writing input device, wherein the writing input device includes an image-inputting unit photographing a recording area on a plane by providing a plurality of electronic cameras that includes imaging devices; an object-recognizing unit extracting an object located on the plane from a photographed image, and determining whether the object is a writing implement by recognizing a shape of the object; a coordinate-calculating unit calculating contact coordinates of the object on the plane based on an image of the object on an imaging device if the object has been determined as the writing implement; a data-storing unit storing a series of the contact coordinates while the object is contacting the plane; and a displaying unit creating depiction data from the series of the contact coordinates, and displaying the depiction data thereon, the method including the steps of dividing a page of a data area into a plurality of areas; assigning one of the areas to the recording area; and managing the written data to be recorded in the recording area as data of the one of the areas in the page.

The above-described objects of the present invention are also achieved by a portable electronic writing input device including a main body unit; a first camera unit; a second camera unit; and an expansion/contraction unit connecting the first and second camera units on left and right parts of the main body unit as well as expanding or contracting an interval between the main body unit and the first or second camera unit, wherein the portable electronic writing input device, being placed on a plane material, photographs a movement of a writing implement by use of the first and second camera units, when a user writes data on the plane material by using the writing implement.

The above-described objects of the present invention are also achieved by a recording medium readable by a computer, tangibly embodying a program of instructions executable by the computer to perform a method, the method including the steps of extracting an object located on a plane from an image including the object and the plane; recognizing whether the object is a specific object; calculating a contact position of the specific object on the plane if the object has been recognized as the specific object; storing written data including a series of coordinates of the contact position calculated while the object is contacting the plane; generating depiction data from the written data; and displaying the depiction data.

The information-inputting device determines a shape of the object on the plane by use of the object-recognizing unit, and calculates the contact positions of the specific object by use of the location-calculating unit if the object has been determined as the specific object by the object-recognizing unit. Subsequently, the information-inputting device stores the track of the contact position while the specific object is contacting the plane. Thus, the information-inputting device can record data in a recording medium in real time while the data is being written on a recording surface without specifying types of writing implements and materials used for the recording surface.

Other objects, features and advantages of the present invention will become more apparent from the following detailed description when read in conjunction with the accompanying drawings.

BRIEF DESCRIPTION OF THE DRAWINGS

FIG. 33 is a flowchart describing steps performed by the writing input device according to a sixteenth embodiment of the present invention;

DESCRIPTION OF THE PREFERRED EMBODIMENTS

A description will now be given of preferred embodiments of the present invention, with reference to the accompanying drawings.

Figure 1A:
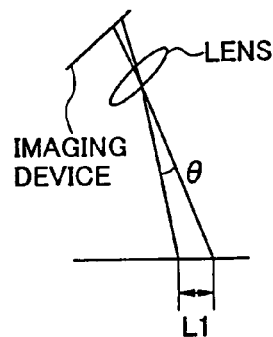
FIGS. 1A and 1B are diagrams used for describing a situation in which an error between actual coordinates of information recorded on recording paper and coordinates detected by a camera increases as distance between the recording paper and the camera increases when the camera photographs the information recorded on the recording paper from an upper oblique direction of the recording paper.
Figure 1B:
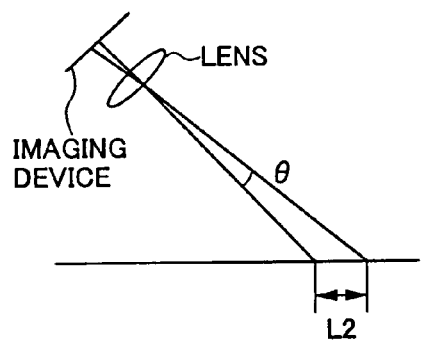
Figure 2:
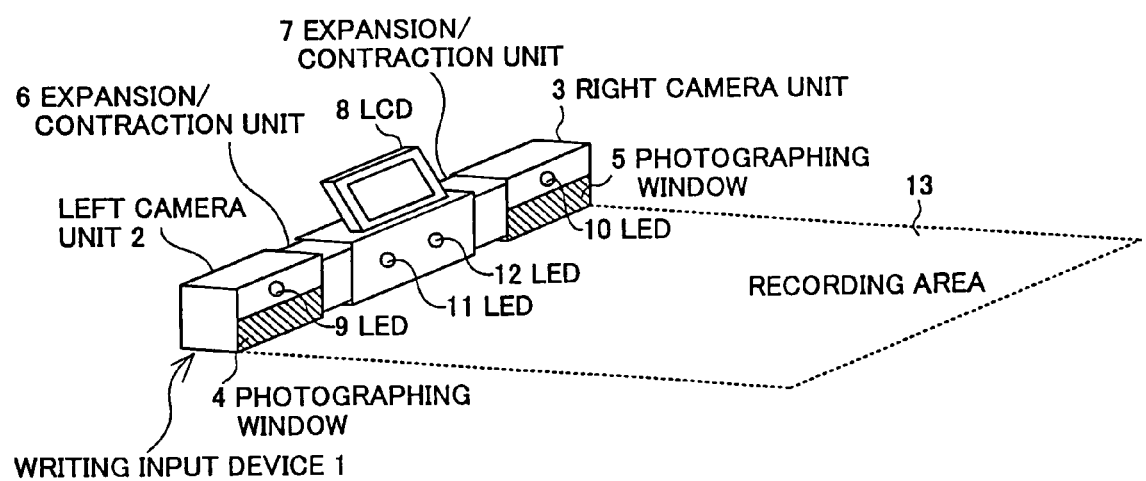
FIG. 2 is a diagram showing an appearance of a writing input device according to the present invention.

FIG. 2 is a diagram showing an appearance of a writing input device according to the present invention. A writing input device 1 shown in FIG. 2 includes a left camera unit 2, a right camera unit 3, photographing windows 4 and 5, expansion/contraction units 6 and 7, an LCD (Liquid Crystal Display) 8, and LEDs (Light-Emitting Diodes) 9 through 12. The writing input device 1 recognizes a shape of an object from an object image photographed by the left camera unit 2 and the right camera unit 3, obtains coordinates of the object, and records the coordinates of the object as data in a recording medium. The writing input device 1 is portable, and is placed on a flat recording surface such as a surface of a table or a surface of paper provided on the table, as shown in FIG. 2. A recording area 13 facing the left camera unit 2 and the right camera unit 3 is then formed. An optical axis of light entering into the camera units 2 and 3 is parallel to the recording surface, and the light is inputted to the writing input device 1 through the photographing windows 4 and 5, which are transparent plates. The light entering the writing input device 1 is photographed by an imaging device provided in the writing input device 1 after being reflected by a mirror and passing through a wide-angle lens also provided therein. In the present invention, a CMOS (Complementary Metal Oxide Semiconductor) image sensor is used as the imaging device, for instance.

The expansion/contraction units 6 and 7 are expanded and contracted by hand operations, and adjust a distance between the left camera unit 2 and the right camera unit 3. The LCD 8 displays information such as letters that are written in the recording area 13. Additionally, the LCD 8 includes various buttons used for its operations, but the buttons are not shown in FIG. 2. The LED 9 is provided on an area above the photographing window 4. The LED 10 is provided on an area above the photographing window 5. The LED 11 and the LED 12 are provided on an area below the LCD 8. The LEDs 9 though 12 are used for illuminating the recording area 13. The above-described LEDs 9 through 12 can be provided on other areas as long as they can illuminate the recording area 13.

Figure 3:
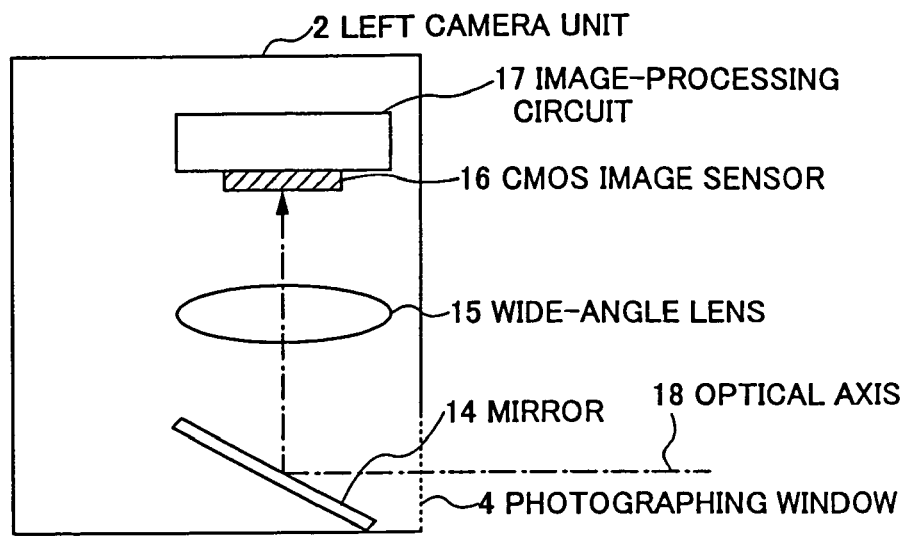
FIG. 3 is a block diagram showing a structure of a camera unit provided in the writing input device.

FIG. 3 is a block diagram showing a structure of the left camera unit 2. FIG. 3 more particularly shows the structure of the left camera unit 2 seen from the side. Both of the left camera unit 2 and the right camera unit 3 have the same structure. The camera unit 2 includes a mirror 14, a wide-angle lens 15, a CMOS image sensor 16 and an image-processing circuit 17, as shown in FIG. 3. Light with its optical axis parallel to the recording surface enters the writing input device 1 through the photographing window 4, and is reflected by the mirror 14 toward the wide-angle lens 15. The light then arrives at the CMOS image sensor 16 through the wide-angle lens 15. The CMOS image sensor 16 executes photoelectric conversion on the received light to create an electric signal by use of a photo-diode provided in each pixel. Subsequently, the CMOS image sensor 16 amplifies the electric signal by use of a cell amplifier used for each pixel, and transmits the amplified signal to the image-processing unit 17 every time a fixed period passes.

Figure 4:
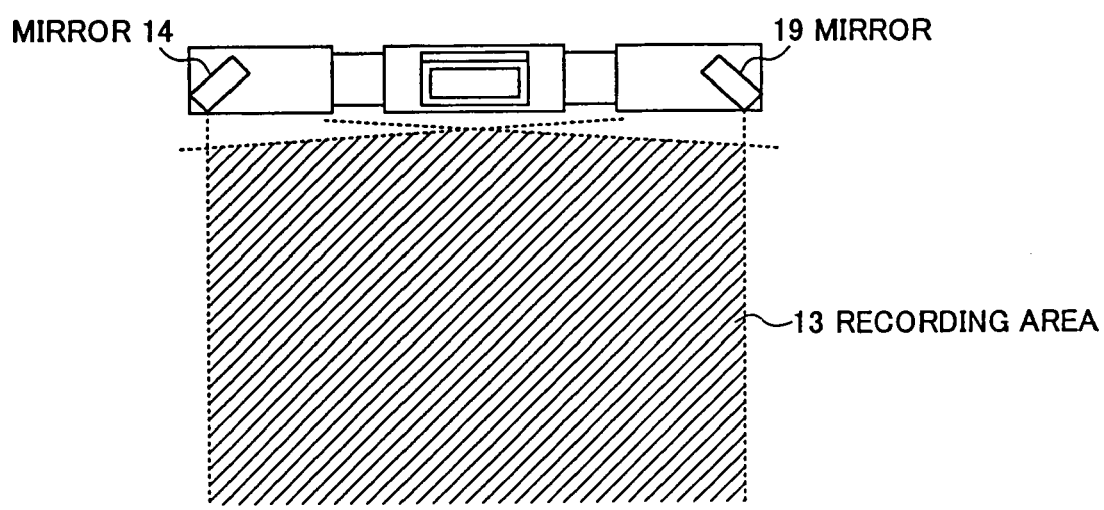
FIG. 4 is a block diagram showing a recording area where the writing input device can obtain coordinates of information recorded thereon.

FIG. 4 is a block diagram showing a recording area where the writing input device 1 can obtain coordinates of information recorded thereon. FIG. 4 shows the writing input device 1 and the recording surface seen from above. The recording area 13 is shown in a shaded area in FIG. 4. A recording position, that is, a position of a writing implement touching the recording surface, can be calculated by using trigonometry from images photographed by the left camera unit 2 and the right camera unit 3, and thus the recording area 13 wherein coordinates of the recording position can be obtained is an area on the recording surface where a photographing area of the left camera unit 2 and a photographing area of the right camera unit 3 overlap. In other words, an area surrounded by broken lines is the recording area 13. A lower boundary of the recording area 13 shown in FIG. 4 is a lowest position of the writing implement where the left camera unit 2 and the right camera unit 3 can detect the position of the writing implement. FIG. 4 also shows the mirror 14 included in the left camera unit 2 and a mirror 19 included in the right camera unit 3. The mirror 14 is placed in the left camera unit 2 in order to reflect incident light of about a 90-degree range entering from the photographing window 4, and to transmit the incident light to the CMOS image sensor 16 through the wide-angle lens 15. Similarly, the mirror 19 is placed in the right camera unit 3 in order to reflect incident light having about 90 degrees range and entering from the photographing window 5, and to irradiate the incident light to a later-mentioned CMOS image sensor 21 through a later-mentioned wide-angle lens 20.

Figure 5:
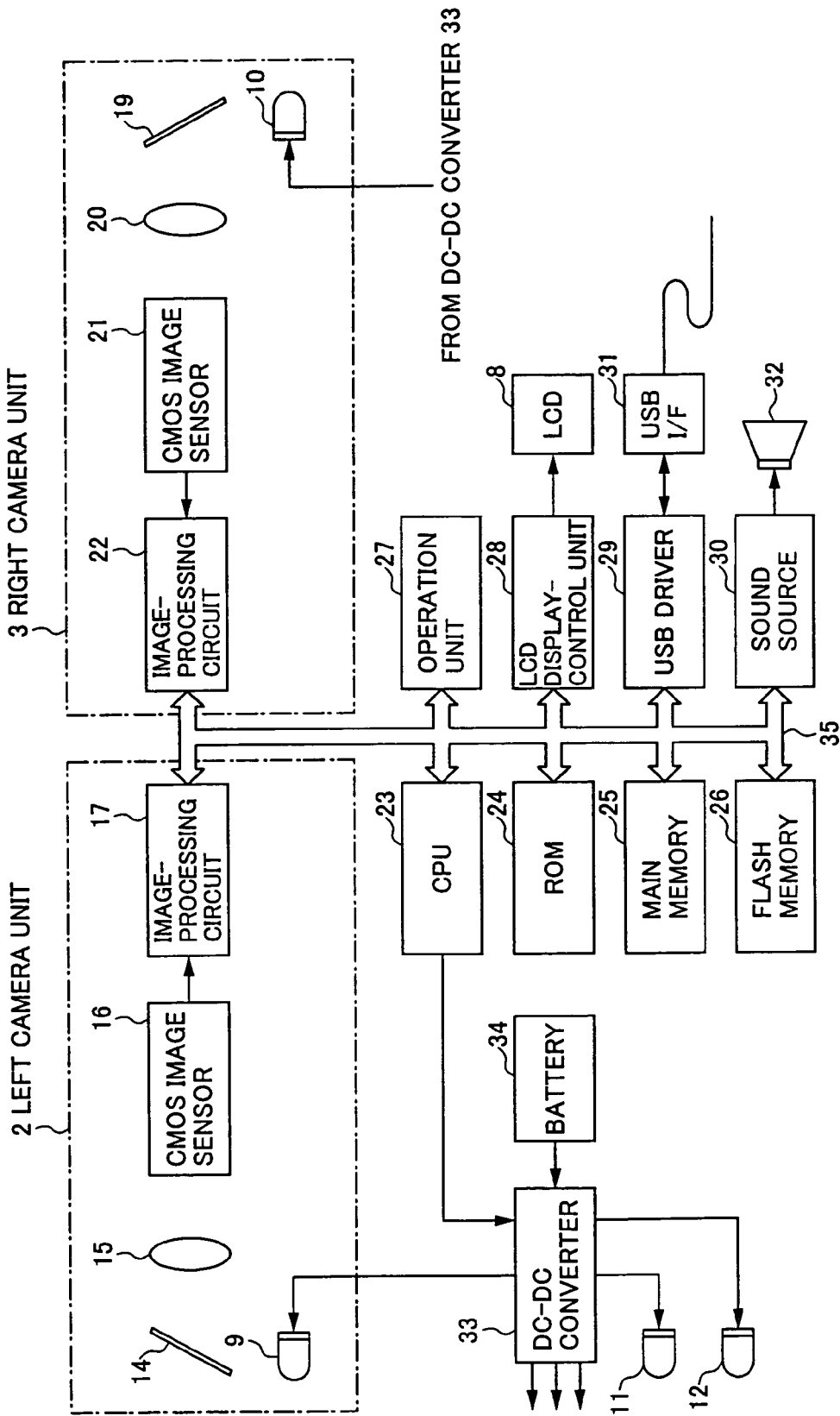
FIG. 5 is a block diagram showing a system structure of the writing input device according to the present invention.

FIG. 5 is a block diagram showing a system structure of the writing input device 1. The writing input device 1 includes the left camera unit 2, the right camera unit 3, a CPU (Central Processing Unit) 23 or a processing unit 23, a ROM (Read-Only Memory) 24, a main memory 25, a flash memory 26, an operation unit 27, an LCD display-control unit 28, a USB (Universal Serial Bus) driver 29, a sound source 30, the LCD 8, a USB interface (I/F) 31, a speaker 32, a DC-DC converter 33, a battery 34, the LED 11, the LED 12, and a system bus 35. The left camera unit 2 includes the mirror 14, the wide-angle lens 15, the CMOS image sensor 16, the image-processing circuit 17, and the LED 9. The right camera unit 3 includes the mirror 19, the wide-angle lens 20, the CMOS image sensor 21, an image-processing circuit 22, and the LED 10.

The mirror 14 reflects incident light entering through the photographing window 4 toward the wide-angle lens 15. The wide-angle lens 15 having a view angle of 90 degrees is placed in the left camera unit 2 to transmit the light reflected by the mirror 14 to the CMOS image sensor 16. The CMOS image sensor 16 executes photoelectric conversion on the light received through the wide-angle lens 15 to an analog signal by use of a photo-diode provided for each pixel therein, amplifies the analog signal by using a cell amplifier provided for each pixel, and outputs the amplified analog signal to the image-processing unit 17 every time a fixed period passes. Similarly, in the right camera unit 3, the mirror 19 reflects incident light entering through the photographing window 5 toward the wide-angle lens 20. The wide-angle lens 20 having a view angle of 90 degrees is placed in the right camera unit 3 to transmit the light reflected by the mirror 19 to the CMOS image sensor 21. The CMOS image sensor 21 executes photoelectric conversion on the light received through the wide-angle lens 20 to an analog signal by use of a photo-diode provided for each pixel therein, amplifies the analog signal by using a cell amplifier provided for each pixel, and outputs the amplified analog signal to the image-processing unit 22 every time a fixed period passes.

Each of the image-processing circuits 17 and 22 includes an A/D (Analog/Digital) conversion circuit, and converts an analog signal respectively received from the CMOS image sensors 16 and 21 to a digital signal. Subsequently, the image-processing circuits 17 and 22 execute a process to extract an outline of a subject image from image data obtained by converting the analog signal to the digital signal, an image recognition process to decide whether the subject image is a writing implement based on the extracted outline, and a process to output information about a position where an object detected as the writing implement is contacting the recording surface. It should be noted that the left camera unit 2 and the right camera unit 3 perform the above-described processes synchronously with each other.

The ROM 24 initially stores a program to control the writing input device 1. The main memory 25 includes a DRAM (Dynamic Random Access Memory), and is used as a work area for the CPU 23. The flash memory 26 stores coordinate data, that is, data about the coordinates of the information recorded in the recording area 13. The operation unit 27 includes various types of keys near the LCD 8, the keys being used for displaying the coordinate data stored in the flash memory 26 on the LCD 8, for forwarding the coordinate data to a personal computer through a USB cable, and for other objects. The LCD display-control unit 28 controls displaying of the coordinate data, an operation menu, and the like on the LCD 8. The USB driver 29 transmits data to a device such as a personal computer connected to a USB cable, and receives data from the device, by executing operations based on a USB standard. The sound source 30 generates a sound signal such as an alarm, and then the generated sound signal is outputted from the speaker 32. The battery 34 is, for example, a nickel-metal hydride battery or a lithium battery. An electric current is supplied from the battery 34 through the DC-DC converter 33 to units in the writing input device 1 in addition to the LEDs 9 through 12. The system bus 35 connects the image-processing units 17 and 22, the CPU 23, the ROM 24, the main memory 25, the flash memory 26, the operation unit 27, the LCD display-control unit 28, the USB driver 29, and the sound source 30.

Figure 6:
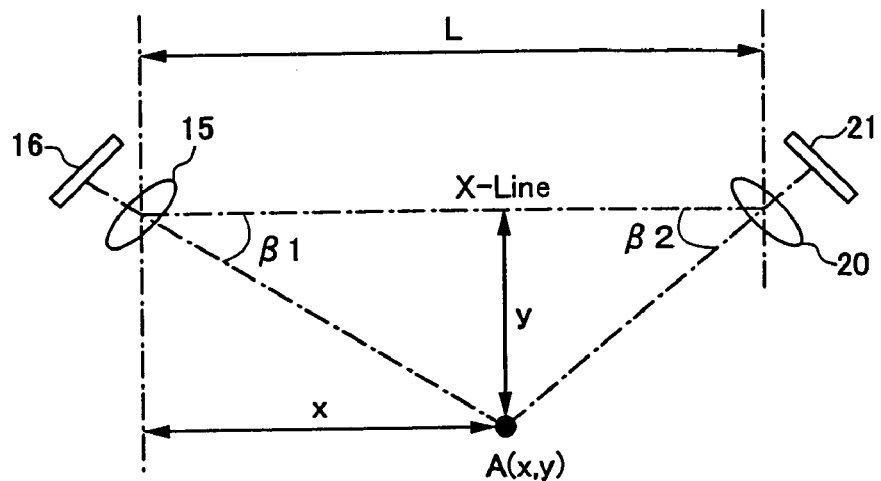
FIG. 6 is a diagram for describing a method to obtain coordinates of a contact point of a writing implement contacting the recording area.
Figure 7:
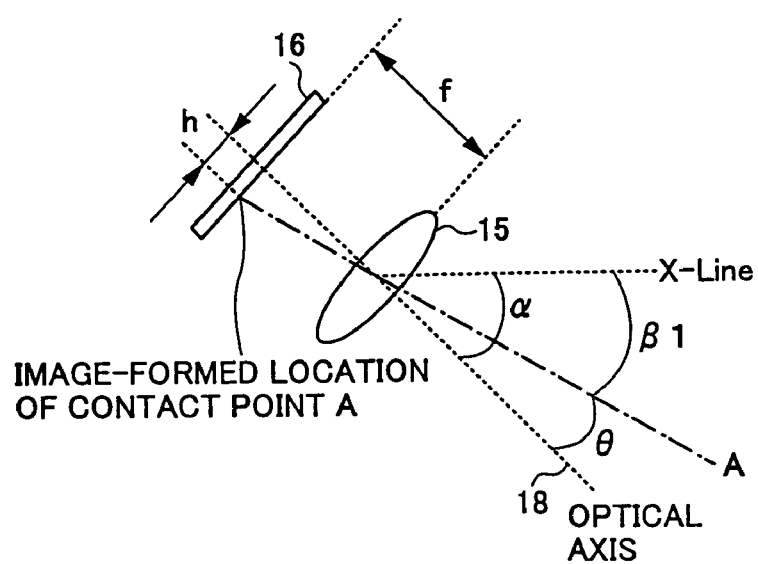
FIG. 7 is a diagram showing an enlargement of an area where a wide-angle lens and a CMOS image sensor are placed in FIG. 6.

A description will now be given of a method to obtain coordinates of a contact point of a writing implement contacting the recording surface. As described with reference to FIG. 3, the CMOS image sensors 16 and 21 are placed downwards respectively in the left camera unit 2 and the right camera unit 3. However, in order to describe the method, it is assumed in FIG. 6 that the mirrors 14 and 19 are omitted. Additionally, it is assumed that the wide-angle lenses 15 and 20, and the CMOS image sensors 16 and 21 are placed as shown in FIG. 6 so that the optical axis of the incident light becomes parallel to the recording surface. A distance between the wide-angle lenses 15 and 20 is named a distance L. The contact point of the writing implement is set as a contact point A. The coordinates of the contact point A are set to (x, y). A straight line connecting the wide-angle lenses 15 and 20 is named a X-Line. An angle between the X-Line and a straight line drawn from the center of the wide-angle lens 15 to the contact point A is named an angle β1. An angle between the X-Line and a straight line drawn from the center of the wide-angle lens 20 to the contact point A is named an angle β2. FIG. 7 is a diagram showing an enlargement of an area where the wide-angle lens 15 and the CMOS image sensor 16 are placed in FIG. 6. In FIG. 7, distances "f" and "h" respectively indicate a distance between the wide-angle lens 15 and the CMOS image sensor 16, and a distance between an image-formed location of the optical axis 18 of the wide-angle lens 15 and an image-formed location of the contact point A on the CMOS image sensor 16. An angle α is an angle between the optical axis 18 of the wide-angle lens 15 and the X-Line. An angle θ is an angle between the optical axis 18 of the wide-angle lens 15 and a straight line connecting the contact point A and its image-formed location. The following two equations are derived from FIGS. 6 and 7.

$$\theta = arc\,\tan(h/f) \qquad \text{EQ1}$$

$$\beta1 = \alpha - \theta \qquad \text{EQ2}$$

A value of the angle β1 for the left camera unit 2 can be obtained from the above equations since the angle a is initially measured as an angle for positioning the wide-angle lenses 15 and 20 so that the optical axes of the wide-angle lenses 15 and 20 intersect with each other. Similarly, a value of the angle β2 can be obtained for the right camera unit 3. Once the values of the angles β1 and β2 have been obtained, the coordinates of the contact point A (x, y) can be obtained by using trigonometry.

$$x = L*\tan\beta2/(\tan\beta1 + \tan\beta2) \qquad \text{EQ3}$$

$$y = x*\tan\beta1 \qquad \text{EQ4}$$

Assuming the mirrors 14 and 19 do not exist in the left camera unit 2 and the right camera unit 3, the description has been given of the method to calculate the coordinates of the contact point A, that is, the contact point of the writing implement. However, since the mirrors 14 and 19 are provided in the writing input device 1 only for changing a direction of the optical axis placed in each of the left camera unit 2 and the right camera unit 3 by reflecting light on the optical axis, the above-described method can also be applied to calculate the coordinates of the contact point of the writing implement in a case that there are mirrors placed in each of the left camera unit 2 and the right camera unit 3. As describe above, both an optical axis of light emitted toward the left camera unit 2 and an optical axis of light emitted toward the right camera unit 3 are parallel to a recording surface, and intersect each other. Accordingly, both of the left camera unit 2 and the right camera unit 3 can detect coordinates of a contact point accurately with no errors. In addition, an area where coordinates of the contact point are read by the left camera unit 2 and the right camera unit 3 can be kept wide.

A detailed description will now be given of embodiments based on the writing input device 1 according to the present invention.

Figure 8:
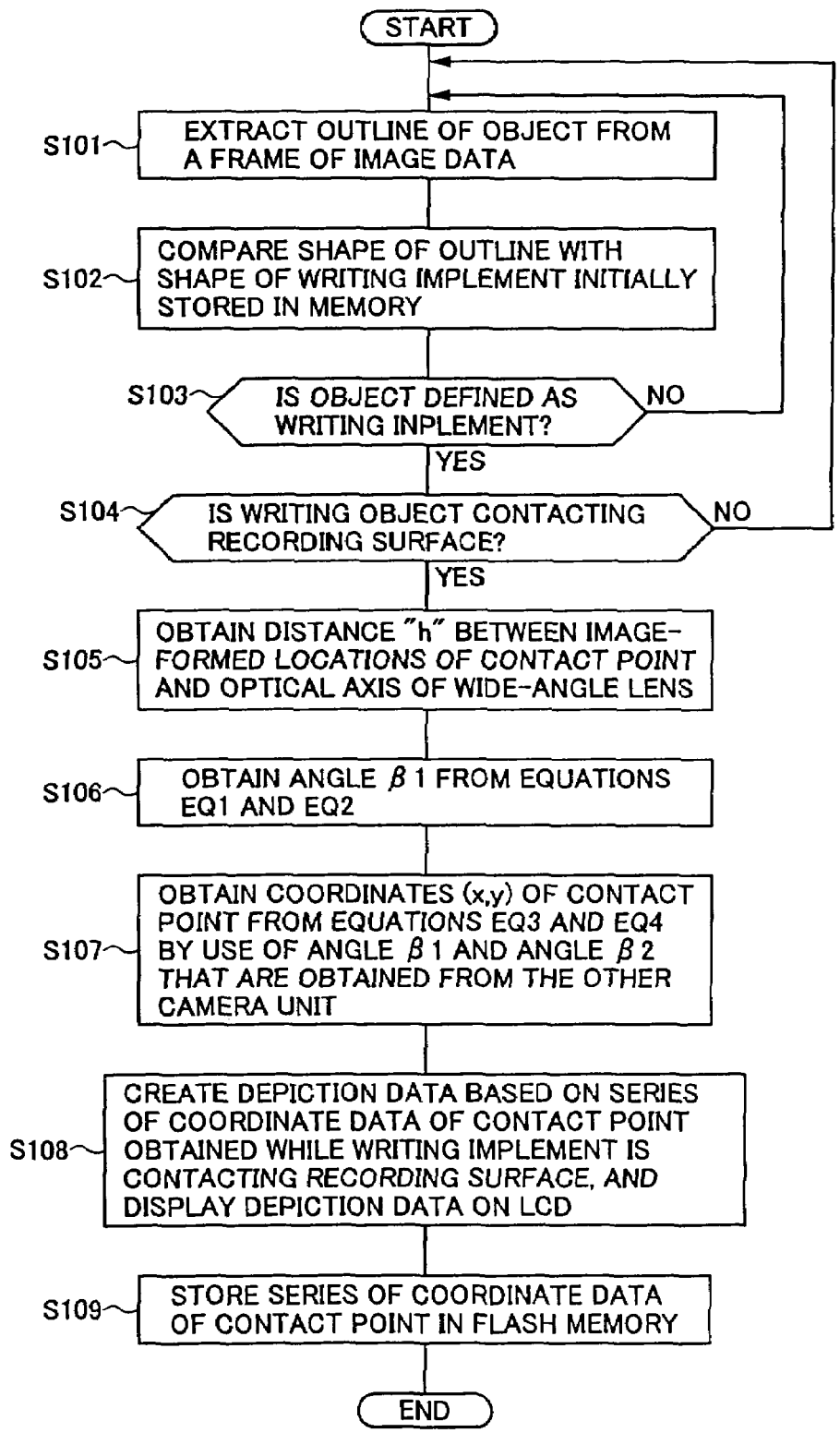
FIG. 8 is a flowchart describing steps performed by the writing input device according to a first embodiment of the present invention.
Figure 9:
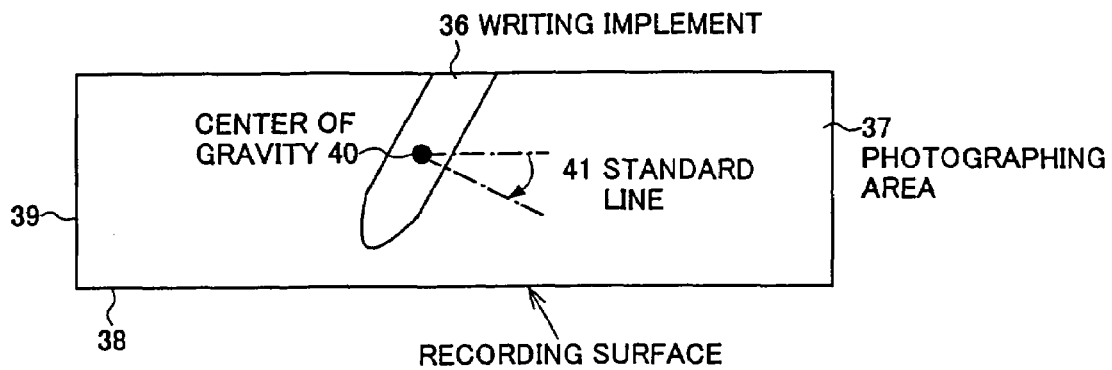
FIG. 9 is a diagram showing an image wherein a standard line is rotating around center of gravity of the writing implement.

A first embodiment of the present invention relates to a method of storing information as digital data in a recording medium in real time while a user is recording the information by use of a pen on a recorded material such as paper. The first embodiment additionally relates to a method of storing information as digital data in a recording medium in real time while a user is recording the information on the recorded material by use of a writing implement such as a stick or a finger whereto ink is not applied. FIG. 8 is a flowchart describing steps performed by the writing input device 1 according to the first embodiment of the present invention. The steps shown in FIG. 8 are actually performed by the image-processing circuits 17 and 22, and the CPU 23 provided in the writing input device 1. When a user records or writes information on a recording surface of a recorded material such as paper by use of a writing implement such as a pen, the left camera unit 2 and the right camera unit 3 photograph writing movement performed by the user. FIG. 9 shows an image of a writing implement 36 photographed by the left camera unit 2 and the right camera unit 3.

The image-processing circuit 17 of the left camera unit 2 converts an analog image signal outputted from the CMOS image sensor 16 into a digital image signal in order to obtain a frame of image data, and extracts an outline of an object from the image data at a step S101. In a case that the number of pixels of the CMOS image sensor 16 in a vertical direction (an upward direction of a vertical side 39) is large, the image-processing circuit 17 controls outputting image signals only for pixels of the CMOS image sensor 16 that form an image having a fixed height from a recording surface 38. An example of the above-described method of extracting the outline of the object is to calculate a density gradient between pixels by applying differentiation, and then to define the outline based on the direction of increasing density gradient and the size of the calculated density gradient. Such method is disclosed in Japanese Laid-open Patent Application No. 63-193282. After the outline has been extracted from the image data, the image-processing circuit 17 determines whether the object is a writing implement or not based on a shape of the extracted outline of the object. An example of image recognition technology to determine the shape of the extracted outline is to obtain a center of gravity 40 of the object, to calculate distances between the center of gravity 40 and points on the outline specified by angles based on the center of gravity 40 in order, and then to define the shape of the extracted outline from relations between the distances and the angles. Such a method is disclosed in Japanese Laid-open Patent Application No. 8-315152. Subsequently, data about the shape of the outline obtained by the above-described method is compared with data that has been stored previously as shapes of writing implements in the ROM 24 or in the flash memory 26 at a step S102. Consequently, the object is defined by the image-processing circuit 17 either as a writing implement or as an object other than writing implements at a step S103. If the object is detected as the object other than the writing implements, the image-processing circuit 17 proceeds to the step S101.

Figure 10:
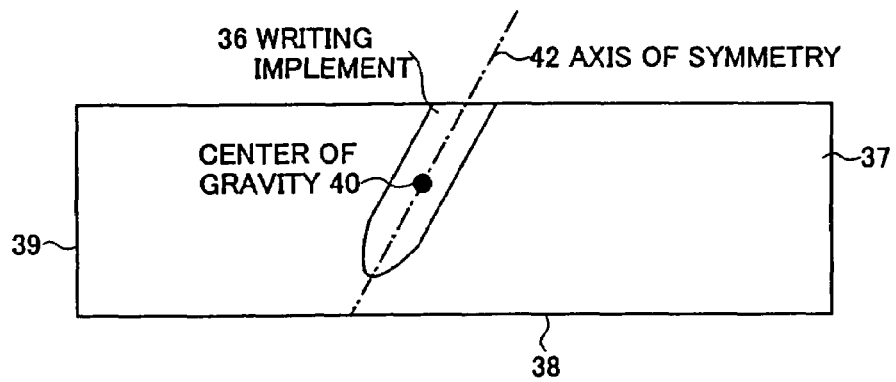
FIG. 10 is a diagram showing an image of the writing implement having symmetry with respect to an axis of symmetry.

Since an angle between the object and the recording surface 38 is not fixed, the data about the object is compared with the data stored in the ROM 24 or the like by rotating a standard line 41 connecting the center of gravity 40 of the object and the outline of the object in an range of certain angles as shown in FIG. 9 in order to define the shape of the object. A plurality of shapes of writing implements can be provided as the data stored in the ROM 24 or the like, wherein the data about the object can be compared with each of the plurality of shapes of writing implements. Another method of defining the object as a writing implement is to check whether the object is symmetric with respect to an axis of symmetry 42 shown in FIG. 10. When the object has been detected as a symmetrical object, the object can be defined as a writing implement. The symmetry of the object can be detected by calculating a distance from the center of gravity 40 to certain points on the outline located around the center of gravity 40 in order.

Figure 11:
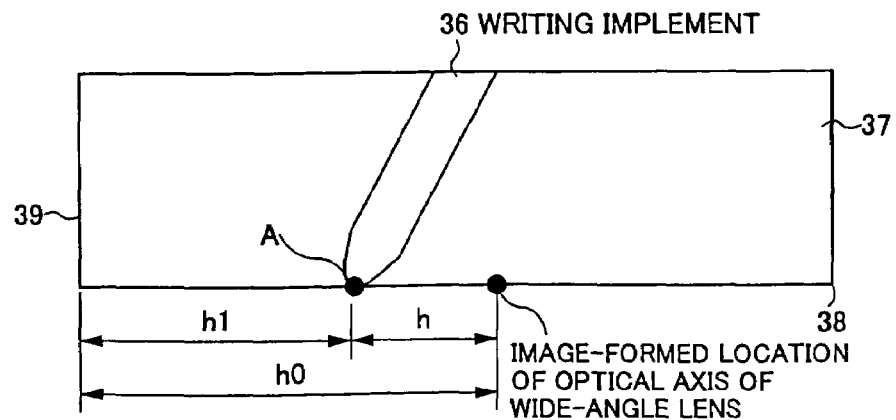
FIG. 11 is a diagram showing an image wherein the writing implement is contacting a recording surface.

If the object has been detected as a writing implement at the step S103, the image-processing circuit 17 determines whether the writing implement has contacted the recording surface 38 as shown in FIG. 11 at a step S104. It should be noted that the recording surface 38 corresponds to a bottom side of a photographing area 37 shown in FIGS. 9, 10 and 11. Thus, to be concrete, the image-processing circuit 17 checks whether an image of the object in the photographing area 37 touches the bottom side thereof. If it is determined at the step S104 that the writing implement has not contacted the recording surface 38, the image-processing circuit proceeds to the step S101. If it is determined at the step S104 that the writing implement has contacted the recording surface 38, the image-processing circuit 17 obtains the distance "h" between the image-formed locations of the contact point A and the optical axis 18 of the wide-angle lens 15 on the CMOS image sensor 16 at a step S105. In FIG. 11, the image-formed location of the optical axis 18 of the wide-angle lens 15 is set as a distance "h0" from the bottom left corner of the CMOS image sensor 16. Additionally, the image-formed location of the contact point A is set as a distance "h1" from the bottom left corner of the CMOS image sensor 16. Then, the distance "h" can be obtained from the following equation.

$$h = h0 - h1$$

It should be noted that the distances "h0" and "h1" can be obtained from the number of pixels counted from the vertical side 39 to the image-formed locations of the optical axis 18 and the contact point A, and a distance between pixels adjacent to each other (a pixel pitch).

Once a value of the distance "h" has been calculated, a value of the angle β1 can be obtained from the equations EQ1 and EQ2 by use of predetermined values of the distance "f" and the angle a at a step S106. The angle β2 can be obtained similarly by taking the above-described steps in the right camera unit 3. Additionally, at a step S107, the coordinates (x, y) of the contact point A on the recording surface can be obtained from the equations EQ3 and EQ4 by use of the values of the angles β1 and β2, and a predetermined value of the distance L. The CPU 23 may execute a calculation using the equations EQ1 through EQ4. Alternatively, the image-processing circuits 17 and 22 may execute a calculation using the equations EQ1 and EQ2. Additionally, the CPU 23 may execute a calculation using the equations EQ3 and EQ4.

The CPU 23 creates depiction data, for instance, by connecting each set of coordinates by straight lines based on a series of coordinate data of the contact point A that was obtained while the writing implement 36 was contacting the recording surface 38. Subsequently, the CPU 23 displays the depiction data on the LCD 8 through the LCD display-control unit 28 at a step S108, and stores the series of the coordinate data of the contact point A in the flash memory 26, for instance, as a single file, at a step S109.

A description will now be given of a second embodiment of the present invention with reference to FIG. 12. The first embodiment describes a case in which the outline of the object is extracted for each frame of the image data after the object has been defined as a writing implement based on the outline of the object. Instead, in the second embodiment, movement of the outline is monitored after the object has been defined as the writing implement, thereby enabling accurate detection of contact of the object with the recording surface 38. In the second embodiment, an optical flow measurement is applied to a method of detecting the movement of the outline. The optical flow measurement is to measure a velocity vector of each point of an image by using a rate of change in a value of each pixel in a certain period and a rate of change in its surrounding pixels in space.

Figure 12:
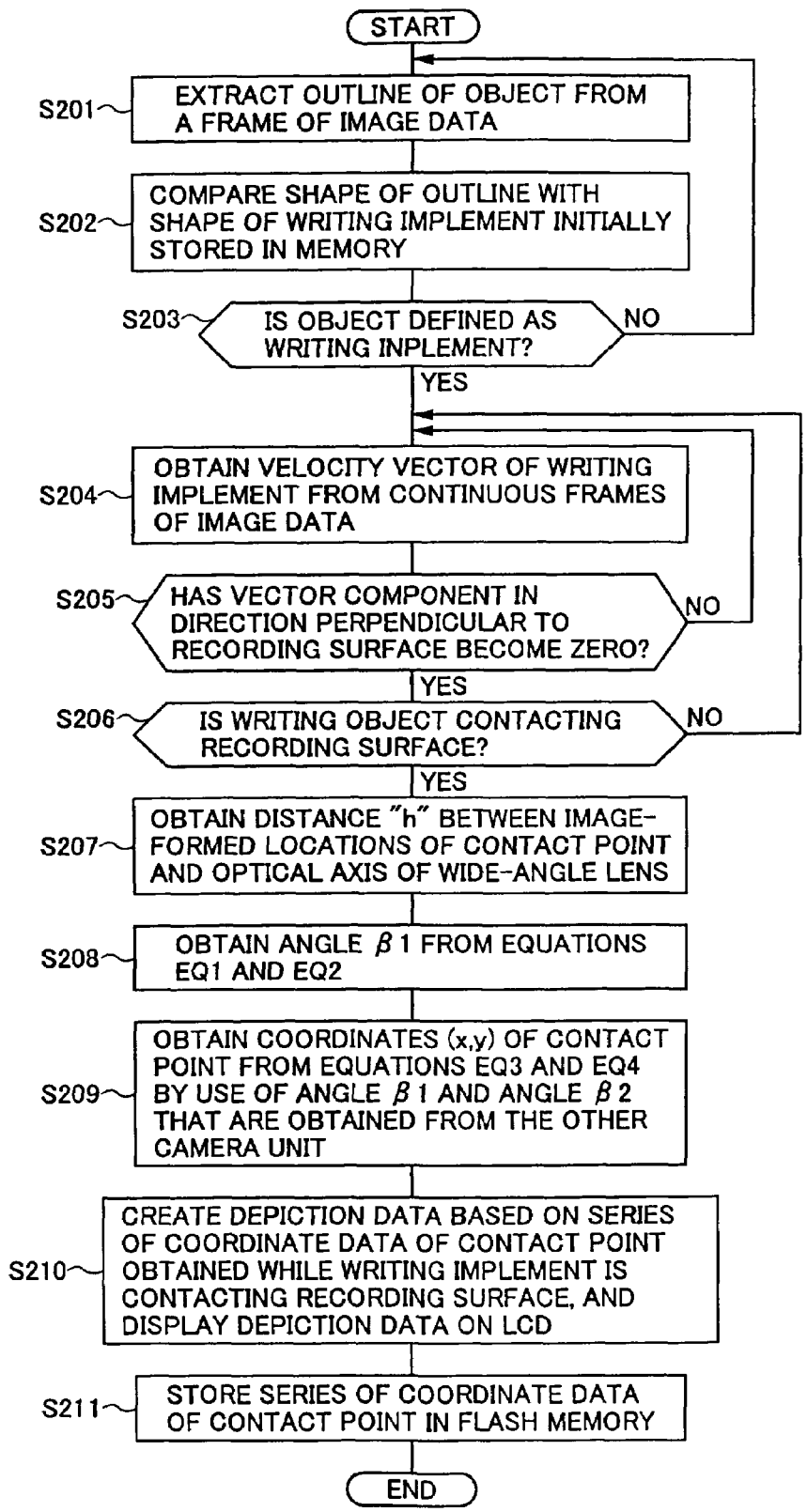
FIG. 12 is a flowchart describing steps performed by the writing input device according to a second embodiment of the present invention.

FIG. 12 is a flowchart describing steps performed by the writing input device 1 according to the second embodiment of the present invention. In FIG. 12, steps S201, S202 and S203 respectively correspond to the steps S101, S102 and S103 shown in FIG. 8. At a step S204, each of the image-processing circuits 17 and 22 obtains a velocity vector of each point on the outline of the object that has been detected as a writing implement by use of continuous frames of the image data of the writing implement. At a step S205, each of the image-processing circuits 17 and 22 checks whether a vector component of the velocity vector in a direction perpendicular to the recording surface 38 has become zero in a case that the writing implement tends to move toward the recording surface 38. If it is determined at the step S205 that the vector component has not become zero, the image-processing circuits 17 and 22 proceed to the step S204. If it is determined at the step S205 that the vector component has become zero, each of the image-processing circuits 17 and 22 checks whether the writing implement has contacted the recording surface 38 at a step S206. If it is determined at the step S206 that the writing implement has not contacted the recording surface 38, the image-processing circuits 17 and 22 proceed to the step S204. If it is determined at the step S207 that the writing implement has contacted the recording surface 38, the image-processing circuits 17 and 22 proceed to a step S207. Steps S207 through S211 correspond to the steps S205 through S209, and thus a description of the steps S207 through S211 will be omitted.

According to the present invention, objects such as a pencil, a stick and a finger may be used as writing implements if they are recognized as writing implements by the writing input device 1. However, the pencil and the stick that can be writing implements have different shapes. Accordingly, in a third embodiment of the present invention, typical shapes of writing implements that are different from each other are initially registered as data in the writing input device 1 so that a user can select one of the typical shapes. If the user selects one of the typical shapes appropriate for a writing implement that is to be used for recording information on the recording surface 38, an area of an imaging device including pixels that output signals generated by photoelectric conversion is changed depending on a selected shape. Accordingly, a load on the writing input device 1 to create image data is reduced.

Figure 13:
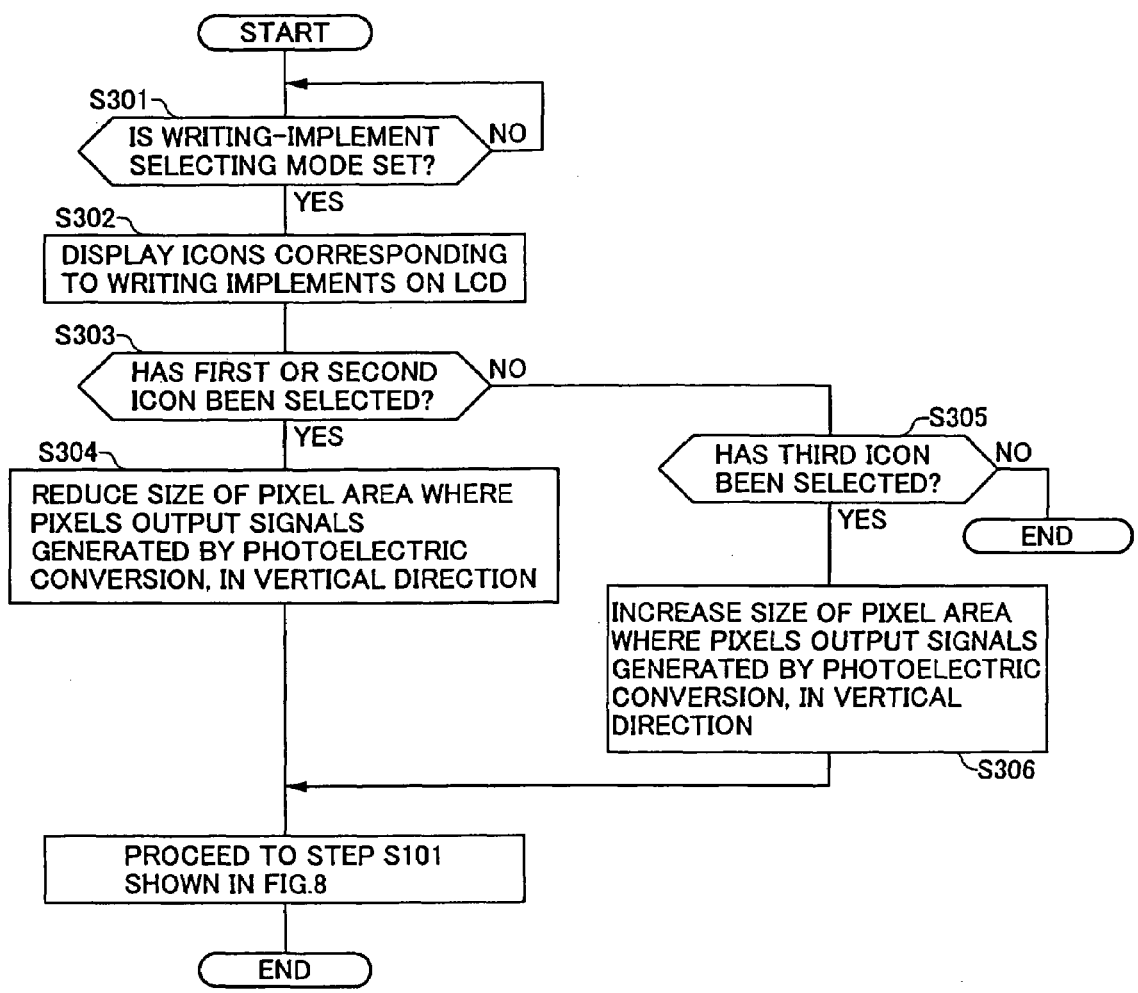
FIG. 13 is a flowchart describing steps performed by the writing input device according to a third embodiment of the present invention.
Figure 14A:
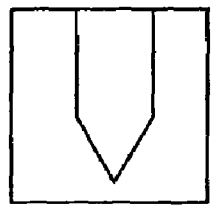
FIGS. 14A, 14B and 14C are diagrams showing icons corresponding to typical writing implements.
Figure 14B:
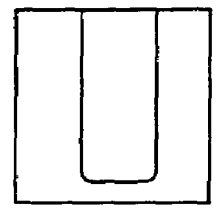
Figure 14C:
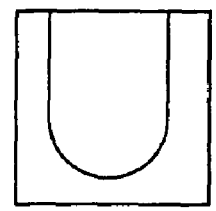

FIG. 13 is a flowchart describing steps performed by the writing input device 1 according to the third embodiment of the present invention. Data regarding shapes of outlines of typical writing implements should be initially stored in the ROM 24 or in the flash memory 26. The user selects a writing-implement selecting mode by use of a selection key provided in the operation unit 27. At a step S301, the CPU 23 checks whether an operation mode has become the writing-implement selecting mode. If the operation mode has become the writing-implement selecting mode, the CPU 23 displays icons corresponding to the typical writing implements on the LCD 8 at a step S302. FIGS. 14A, 14B and 14C show examples of the icons. FIG. 14A shows a first icon indicating writing implements such as a ballpoint pen, a pencil and a mechanical pencil whose holding parts are comparatively thin and whose tip is sharp. FIG. 14B shows a second icon indicating writing implements such as a stick and a marking pen with a cap on. Additionally, FIG. 14C shows a third icon indicating writing implements such as a finger. A height from the recording surface 38 in the photographing area 37 necessary for deciding shapes of the writing implements such as the pencil and the marking pen corresponding to the first and the second icons is less than that for deciding the writing implements such as the finger corresponding to the third icon while the writing implements corresponding to the first, second and third icons are contacting the recording surface 38.

Therefore, an area on the CMOS image sensors 16 and 21 including pixels that output signals generated by the photoelectric conversion is changed depending to an icon selected by the user. At a step S303, the CPU 23 checks whether the first icon or the second icon has been selected by the user. If it is determined at the step S303 that the first icon or the second icon has been selected, the image-processing circuits 17 and 22 reduce the number of pixels in the direction perpendicular to the recording surface 38 that output signals generated by the photoelectric conversion at a step S304, followed by proceeding to the step S101 of the first embodiment (FIG. 8). Subsequently, the steps S101 through S109 are executed. If it is determined at the step S303 that the first icon or the second icon has not been selected, the CPU 23 checks whether the third icon has been selected by the user, at a step S305. If it is determined at the step S305 that the third icon has been selected, the image-processing circuits 17 and 22 increase the number of pixels in the direction perpendicular to the recording surface 38 that output signals generated by the photoelectric conversion at a step S306, followed by proceeding to the step S101 of the first embodiment (FIG. 8). Subsequently, the steps S101 through S109 are executed. It should be noted that the image-processing circuits 17 and 22 output a signal specifying the area including pixels that output signals generated by photoelectric conversion to the CMOS image sensors 16 and 21 respectively.

A description will now be given of a fourth embodiment of the present invention with reference to FIG. 15. In the fourth embodiment of the present invention, typical shapes of writing implements that are different from each other are initially registered as data in the writing input device 1 so that a user can select one of the typical shapes. If the user selects one of the typical shapes appropriate for a writing implement that is to be used for recording information on the recording surface 38, data about a selected shape is used as reference data for deciding whether an object contacting the recording surface 38 is for recording information on the recording surface 38 or not, thereby increasing accuracy of the above-described decision process, as well as reducing the load on the writing input device 1 to create image data.

Figure 15:
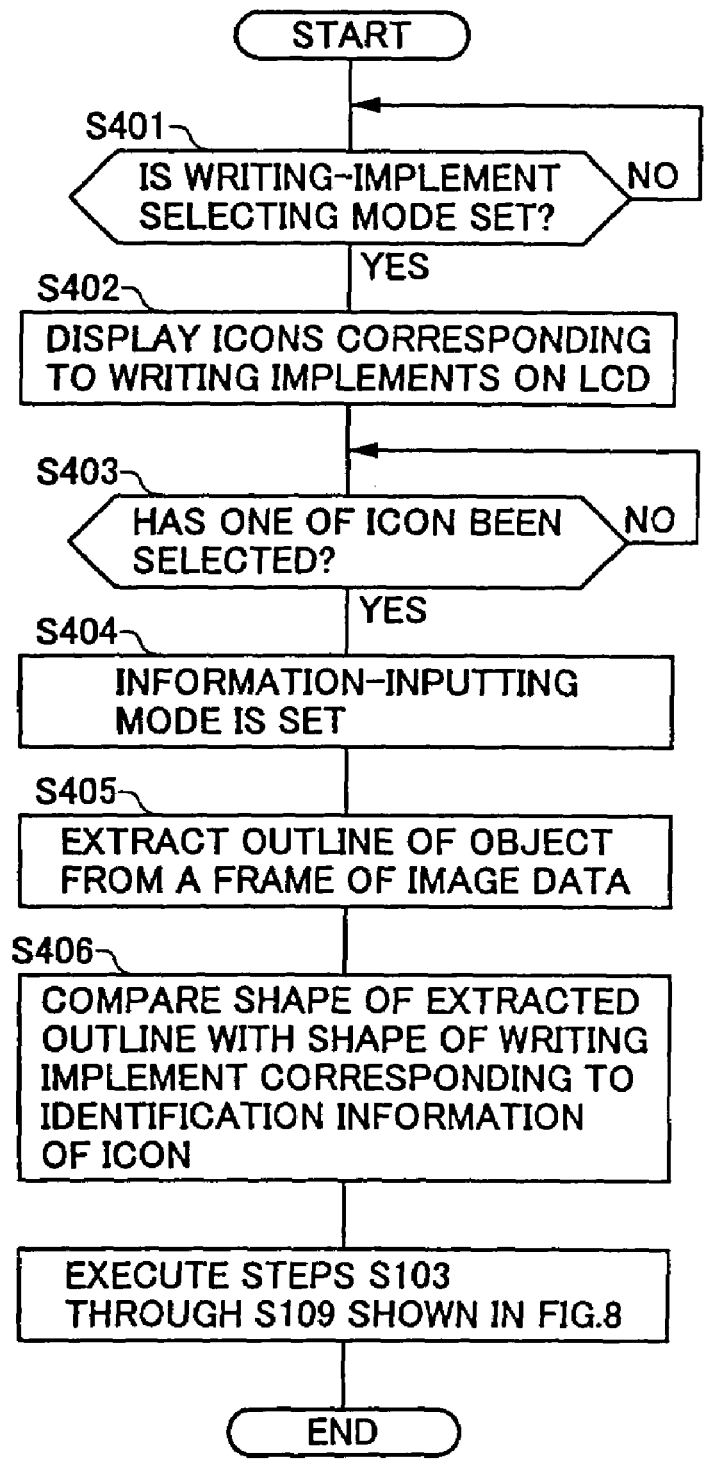
FIG. 15 is a flowchart describing steps performed by the writing input device according to a fourth embodiment of the present invention.

FIG. 15 is a flowchart describing steps performed by the writing input device 1 according to the fourth embodiment of the present invention. Data related to shapes of outlines of typical writing implements should be initially stored in the ROM 24 or in the flash memory 26, each data corresponding to identification information of an icon. The typical writing implements correspond to the icons described in the third embodiment (FIG. 14). At a step S401, the CPU 23 checks whether an operation mode has become the writing-implement selecting mode by a key operation executed by the user. If the operation mode has become the writing-implement selecting mode, the CPU 23 displays the icons corresponding to the typical writing implements on the LCD 8 at a step S402. When detecting that one of the icons has been selected at a step S403, the CPU 23 stores identification information of a selected icon in the main memory 25. At a step S404, an information-inputting mode starts following the writing-implement selecting mode. At a step S405, the image-processing circuits 17 and 22 convert analog image signals outputted respectively from the CMOS image sensors 16 and 21 to digital image signals in order to obtain a frame of image data, and extract an outline of the object from the frame of the image data. After the outline of the object has been extracted, at a step S406, the image-processing circuits 17 and 22 decide whether the object is a writing implement based on a shape of the extracted outline by using the data related to shapes of outlines of typical writing implements that has been stored in the ROM 24 or in the flash memory 26. In other words, the image-processing circuits 17 and 22 compare data related to the shape of the extracted outline with the data related to shapes of outlines of typical writing implements that corresponds to the identification information of the selected icon stored in the main memory 25. If it is determined at the step S406 that both of the data are identical, the image-processing circuits 17 and 22 determine the object as a writing implement (step S103 in FIG. 8). Subsequently, the steps S104 through S109 are executed.

A description will now be given of a fifth embodiment of the present invention with reference to FIG. 16. In a case that there is a pattern similar to a writing implement in images of the writing implement photographed by the left camera unit 2 and the right camera unit 3, the writing input device might misunderstand the pattern as the writing implement. In the fifth embodiment, the writing implement is photographed to obtain data related to a shape of the writing implement before a user starts recording information by use of the writing implement on the recording surface 38, and then the data is stored in a memory. The data is used as reference data for deciding whether an object is the writing implement when the object is contacting the recording surface 38, thereby increasing accuracy of the above-described decision process, as well as reducing the load on the writing input device 1 to create image data.

Figure 16:
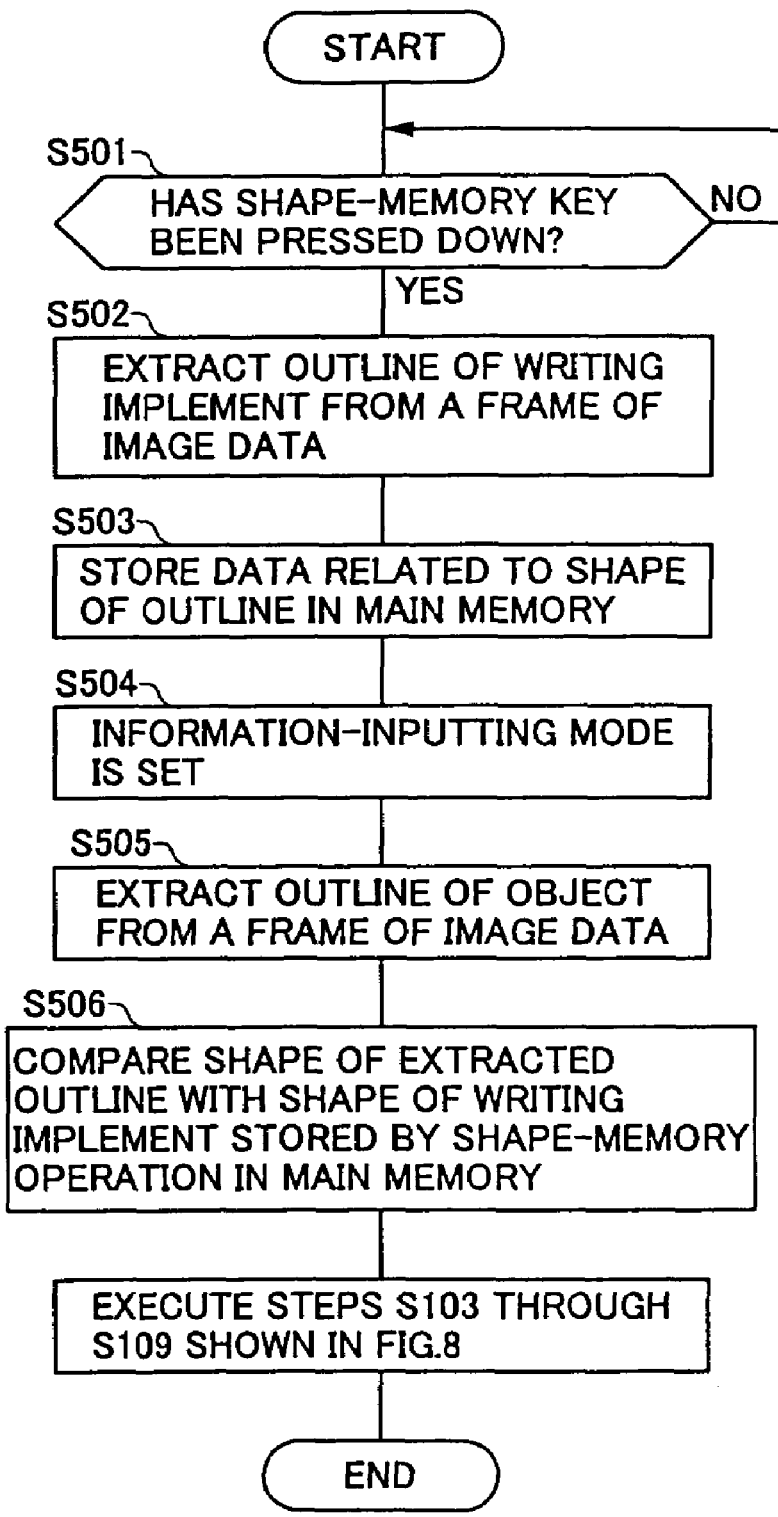
FIG. 16 is a flowchart describing steps performed by the writing input device according to a fifth embodiment of the present invention.

FIG. 16 is a flowchart describing steps performed by the writing input device 1 according to the fifth embodiment of the present invention. Before the information-inputting mode, a writing implement is photographed under a condition that the writing implement is contacting the recording surface 38 or is close to the recording surface 38. Additionally, a shape-memory key provided in the operation unit 27 is pressed down by a user for storing data related to a shape of the writing implement in the main memory 25. When the CPU 23 detects that the shape-memory key has been pressed down at a step S501, the image-processing circuits 17 and 22 convert analog image signals outputted from the CMOS image sensors 16 and 21 to digital image signals in order to obtain a frame of image data of the writing implement, and extract an outline of the writing implement from the obtained frame of the image data at a step S502. At a step S503, after the outline of the writing implement has been extracted, the CPU 23 stores data related to a shape of the outline in the main memory 25, the data being used for deciding the shape of the writing implement. Once the shape of the outline is stored in the main memory 25, an operation mode shifts to the information-inputting mode at a step S504. At a step S505, the image-processing circuits 17 and 22 convert analog image signals outputted from the CMOS image sensors 16 and 21 to digital image signals in order to obtain a frame of image data of an object, and extract an outline of the object from the obtained frame of the image data. At a step S506, after the outline of the object has been extracted, the image-processing circuits 17 and 22 decide whether the object corresponds to the writing implement that was initially photographed, based on the outline of the object by use of the data that is related to the shape of the writing implement and is stored in the main memory 25. In other words, the image-processing circuits 17 and 22 compare data related to the extracted outline of the object with the data related to the shape of the writing implement. Subsequently, the image-processing circuits 17 and 22 proceed to the step S103 shown in FIG. 8.

Figure 17:
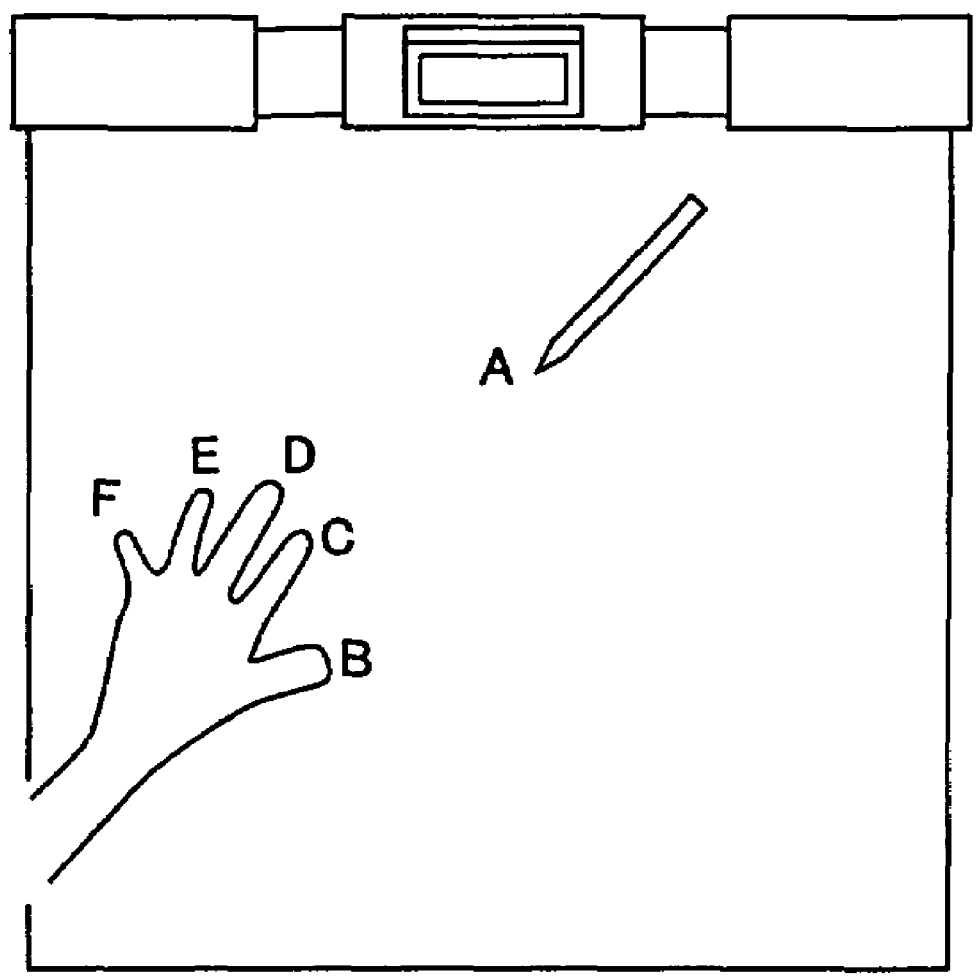
FIG. 17 is a diagram showing a case in which the writing input device recognizes a plurality of writing implements.

In the above-described embodiments, the writing input device 1 recognizes only one object for recording information on the recording surface 38. However, there is a case that more than one object, for example, a pen and a finger are recognized simultaneously as writing implements by an image recognition method of the writing input device 1. A sixth embodiment provides a solution to the above-described case. To be concrete, when a plurality of objects has been recognized simultaneously as writing implements by the writing input device 1, the writing input device 1 defines an object that is the closest to the left camera unit 2 and the right camera unit 3 as a writing implement. In the sixth embodiment, a description will be given of a case that there are two objects recognized simultaneously as writing implements. As shown in FIG. 17, paper is used as a recorded material, whereon a user writes information by use of a ballpoint pen with his or her right hand, and holds the paper with fingers of his or her left hand. In FIG. 17, a contact point A is a contact point of the ballpoint pen and the paper. Contact points B, C, D, E and F are contact points of the fingers and the paper. It should be noted that the user's right hand is not shown in FIG. 17 since the right hand is not recognized as a writing implement.

Figure 18:
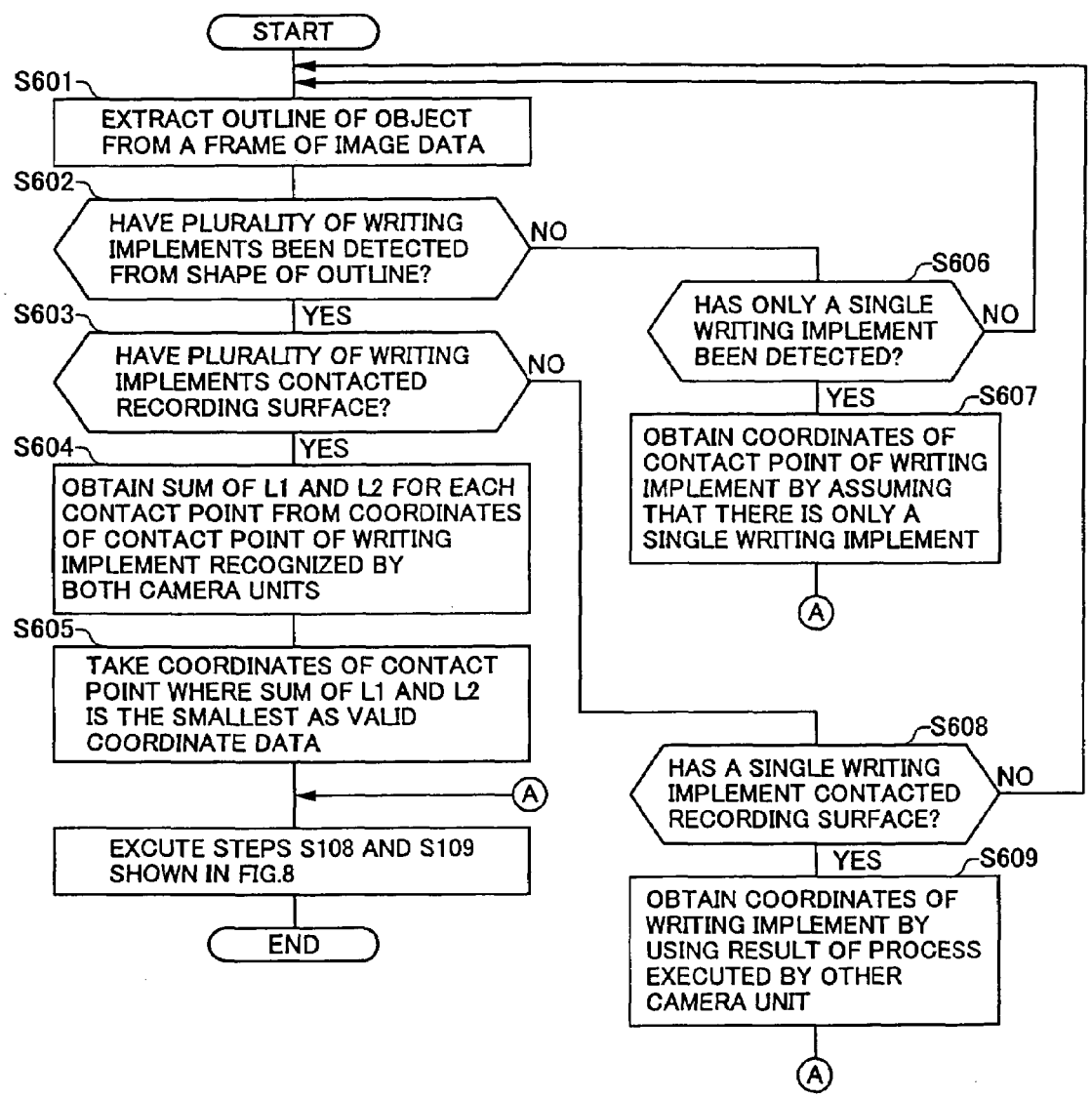
FIG. 18 is a flowchart describing steps performed by the writing input device according to a sixth embodiment of the present invention.

FIG. 18 is a flowchart describing steps performed by the writing input device 1 according to the sixth embodiment of the present invention. At the left camera unit 2, the image-processing circuit 17 converts an analog image signal outputted from the CMOS image sensor 16 to a digital image signal in order to obtain a frame of image data of an object, and then extracts an outline of the object from the frame of image data at a step S601. At a step S602, the image-processing circuit 17 compares the extracted outline with data related to shapes of writing implements such as a pen and a finger that has been stored in the ROM 24 or in the flash memory 26 in order to decide whether the object consists of a plurality of writing implements. Since the thumb and the index finger of the left hand are behind the middle finger of the left hand as shown in FIG. 17, the thumb and the index finger are not recognized as writing implements. Consequently, the other three fingers of the left hand and the ballpoint pen are recognized as writing implements by the image-processing circuit 17. Meanwhile, the above-described image recognition process is performed at the right camera unit 3. At the right camera unit 3, the image-processing circuit 22 converts an analog image signal outputted from the CMOS image sensor 21 to a digital image signal in order to obtain a frame of image data of the object, and then extracts an outline of the object from the frame of image data at the step S601. At the step S602, the image-processing circuit 22 compares the extracted outline with the data related to shapes of writing implements that has been stored in the ROM 24 or in the flash memory 26 in order to decide whether the object consists of a plurality of writing implements. Since the ring finger and the little finger of the left hand are behind the middle finger of the left hand as shown in FIG. 17, the ring finger and the little finger are not recognized as writing implements. Additionally, the thumb and the index finger of the left hand are behind the right hand that is not shown in FIG. 17, and thus the thumb and the index finger are not recognized as writing implements. Consequently, the middle finger of the left hand and the ballpoint pen are recognized as writing implements by the image-processing circuit 22. Accordingly, writing implements that are recognized by both of the image-processing circuits are the middle finger of the left hand and the ballpoint pen.

Figure 19:
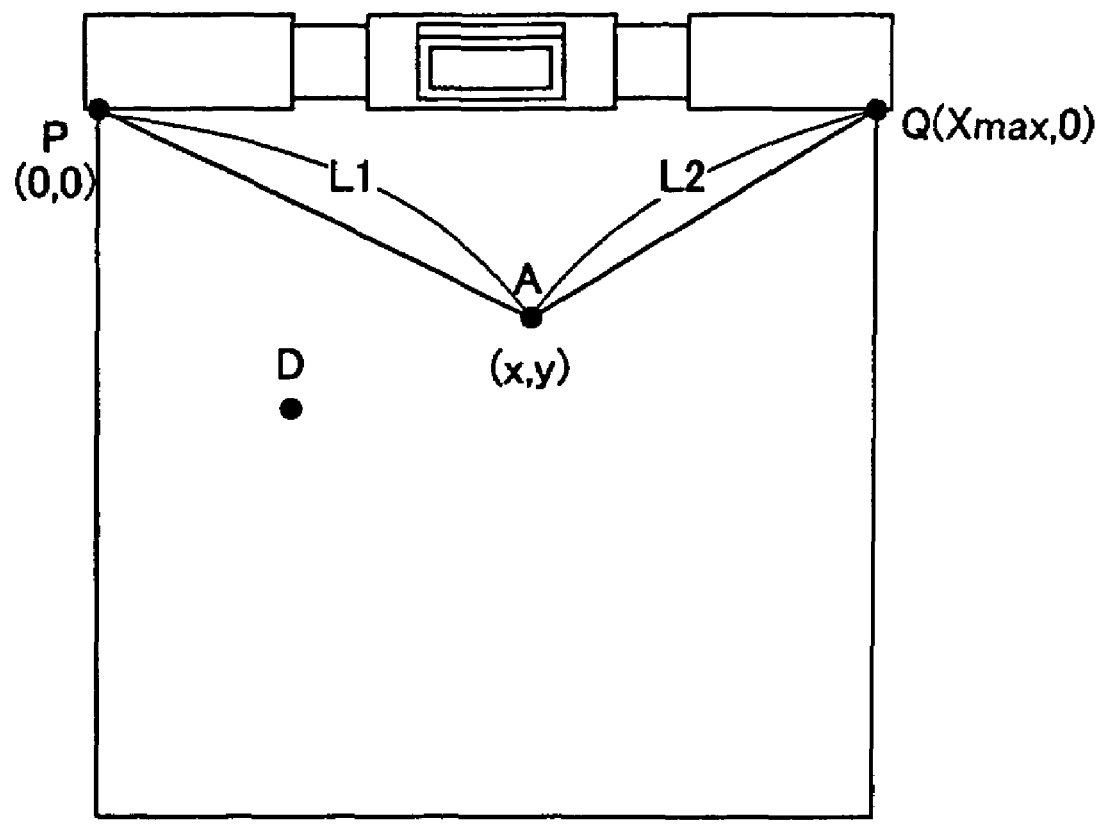
FIG. 19 is a diagram showing a method of obtaining a valid contact point from a plurality of contact points when a plurality of writing implements are contacting the recording surface.

If it is determined by both of the image-processing circuits 17 and 22 at the step S602 that the object consists of a plurality of the writing implements as described above, the image-processing circuits 17 and 22 decide whether the writing implements are contacting the recording surface at a step S603 similarly to the step S104 of the first embodiment. If it is determined at the step S603 that the writing implements are contacting the recording surface, the image-processing circuits 17 and 22 calculate coordinates of the contact point A of the ballpoint pen and the contact point D of the middle finger from the equations EQ1 through EQ4. In FIG. 19, the origin of coordinates is provided as an origin P (0,0) at the top left corner of the recording surface. Additionally, a point Q (Xmax, 0) is given at the top right corner of the recording surface. A distance L1 is a distance from each of the contact points A and D to the origin P. A distance L2 is a distance from each of the contact points A and D to the point Q. Assuming the coordinates of the contact point A are (x, y), the distances L1 and L2 for the contact point A are obtained by use of the following equations.

$$L1=\sqrt{(x^2+y^2)}$$

$$L2=\sqrt{((X\mathrm{max}-x)^2+y^2)}$$

Similarly, the distances L1 and L2 for the contact point D are obtained. Subsequently, at a step S604, the sum of the distances L1 and L2 is calculated for each of the contact points A and D. In the sixth embodiment, since the sum for the contact point A is greater than that for the contact point D, the image-processing circuits 17 and 22 define an object contacting the paper at the contact point A, that is, the ballpoint pen as a valid writing implement. At a step S605, in the case that the image-processing circuits 17 and 22 recognize a plurality of writing implements contacting the recording surface, the image-processing circuits 17 and 22 obtain coordinates of a contact point where the sum of the distances L1 and L2 is the smallest, as valid coordinate data. The steps S108 and S109 are executed after the step S605.

If it is determined by both of the image-processing circuits 17 and 22 at the step S602 that the object does not consist of a plurality of writing implements, the image-processing circuits 17 and 22 proceed to a step S606, and check whether a single writing implement has been recognized. If not, the image-processing circuits 17 and 22 proceed to the step S601. If it is determined at the step S606 that a single writing implement has been recognized, the image-processing circuits 17 and 22 obtain coordinates of a contact point of the single writing implement. Subsequently, the steps S108 and S109 of the first embodiment are executed.

If it is determined at the step S603 that a plurality of writing implements are not contacting the recording surface at a step S603, the image-processing circuits 17 and 22 proceed to the step S608, and check whether a single writing implement is contacting the recording surface. If not, the image-processing circuits 17 and 22 proceed to the step S601. If it is determined at the step S608 that a single writing implement is contacting the recording surface, the image-processing circuits 17 and 22 obtain coordinates of a contact point of the single writing implement. Subsequently, the steps S108 and S109 of the first embodiment are executed.

In FIG. 19, an area near a line connecting the origin P and the point Q includes an area that cannot be detected as a recording area of the writing input device 1. However, such a problem can be solved by changing specifications of the writing input device 1. For instance, the origin P and the point Q may be provided at locations that are certain distance away in a Y-direction from the writing input device 1 instead of locations contacting the writing input device 1.

According to the sixth embodiment, in a case that a plurality of writing implements such as a pen and a finger is recognized by camera units, an object that is the closest to the camera units is selected as the only writing implement. For example, while a user is writing information on a recording sheet with a pen as well as holding the recording sheet by his or her hand, written data of the pen is recorded in a recording medium as electric data if the pen is placed closer than fingers to the camera units. Additionally, the writing input device 1 according to the sixth embodiment can prevent a user from inputting undesired-information to the writing input device 1 in a case that an object other than writing implements is recognized as a writing implement by mistake.

Figure 20:
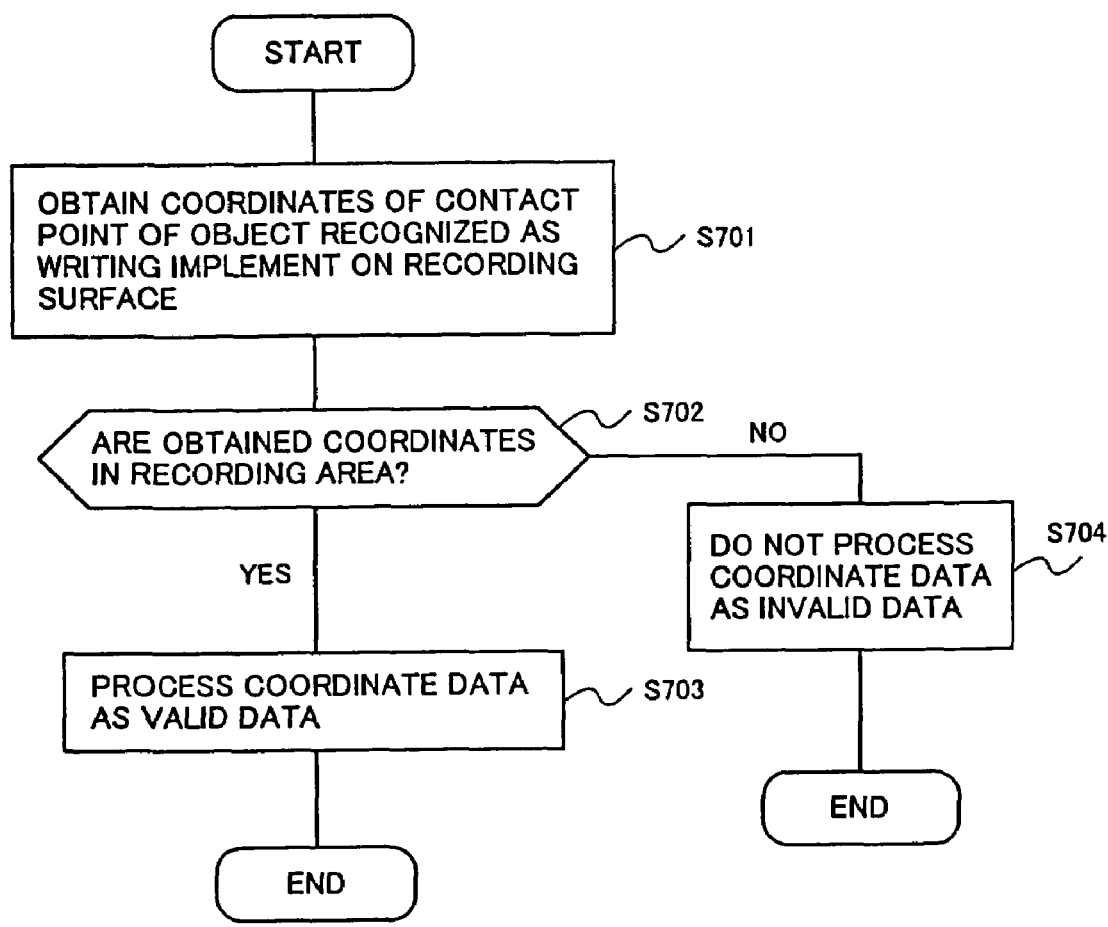
FIG. 20 is a flowchart describing steps performed by the writing input device according to a seventh embodiment of the present invention.

A seventh embodiment of the present invention enables simple management of data inputted by a writing implement by defining a size of a recording area as a standard paper size. FIG. 20 is a flowchart describing steps performed by the writing input device according to the seventh embodiment of the present invention. A length of the recording area 13 in the vertical direction shown in FIG. 4 is defined, for instance, as a height of a letter size (A4). Such information is initially recorded in the ROM 24. At a step S701, coordinates of a contact point of a writing implement contacting the recording surface are obtained by use of one of the methods described in the first through fifth embodiments. If the obtained coordinates of the contact point are in the defined recording area at a step S702, the CPU 23 processes data related to the obtained coordinates as valid data at a step S703. To be concrete, the CPU 23 creates depiction data based on a series of coordinate data of the contact point. Subsequently, the CPU 23 displays the depiction data on the LCD 8 through the LCD display-control unit 28 and stores the series of the coordinate data of the contact point in the flash memory 26. On the other hand, if the obtained coordinates of the contact point are located outside the defined recording area at the step S702, the CPU 23 defines the data related to the obtained coordinates as invalid data, and does not execute the above-described displaying and storing processes at a step S704.

In an eighth embodiment of the present invention, a user can set a size of the recording area 13 to one of a letter size (A4) with a longer side placed in the vertical direction (an A4 height), the letter size with a shorter side placed in the vertical direction (an A4 width), a legal size (B4) with a longer side placed in the vertical direction (a B4 height), the legal size with a shorter side placed in the vertical direction (a B4 width), and the like. Such information is initially stored in the ROM 24. Additionally, width of the recording area 13 can be altered as a distance changes between the left camera unit 2 and the right camera unit 3 in the eighth embodiment. The expansion/contraction units 6 and 7 shown in FIG. 2 can expand and contact by a hand operation. By use of the expansion/contraction units 6 and 7, a user can set the width of the recording area 13 to any of the A4 height, the A4 width, the B4 height and the B4 width. When both of the expansion/contraction units 6 and 7 contract the most, the distance between the left camera unit 2 and the right camera unit 3 becomes the shortest. Consequently, a size of the recording area 13 is set to the A4 height. When both of the expansion/contraction units 6 and 7 expand the most, the distance between the left camera unit 2 and the right camera unit 3 becomes the longest. Consequently, a size of the recording area 13 is set to the B4 width. Additionally, when the expansion/contraction unit 6 on the left contracts the most, and the expansion/contraction unit 7 on the right expands the most, a size of the recording area 13 is set to the B4 height. Additionally, when the expansion/contraction unit 6 on the left expands the most, and the expansion/contraction unit 7 on the right contracts the most, a size of the recording area 13 is set to the A4 width. Each of the expansion/contraction units 6 and 7 is provided with a switch that is not shown in the figures, and thus a state of expansion/contraction of each of the expansion/contraction units 6 and 7 can be detected by checking the switch. In other words, by checking a combination of on/off settings of switches provided in the expansion/contraction units 6 and 7, the CPU 23 can detect which paper size is selected by a user.

Figure 21:
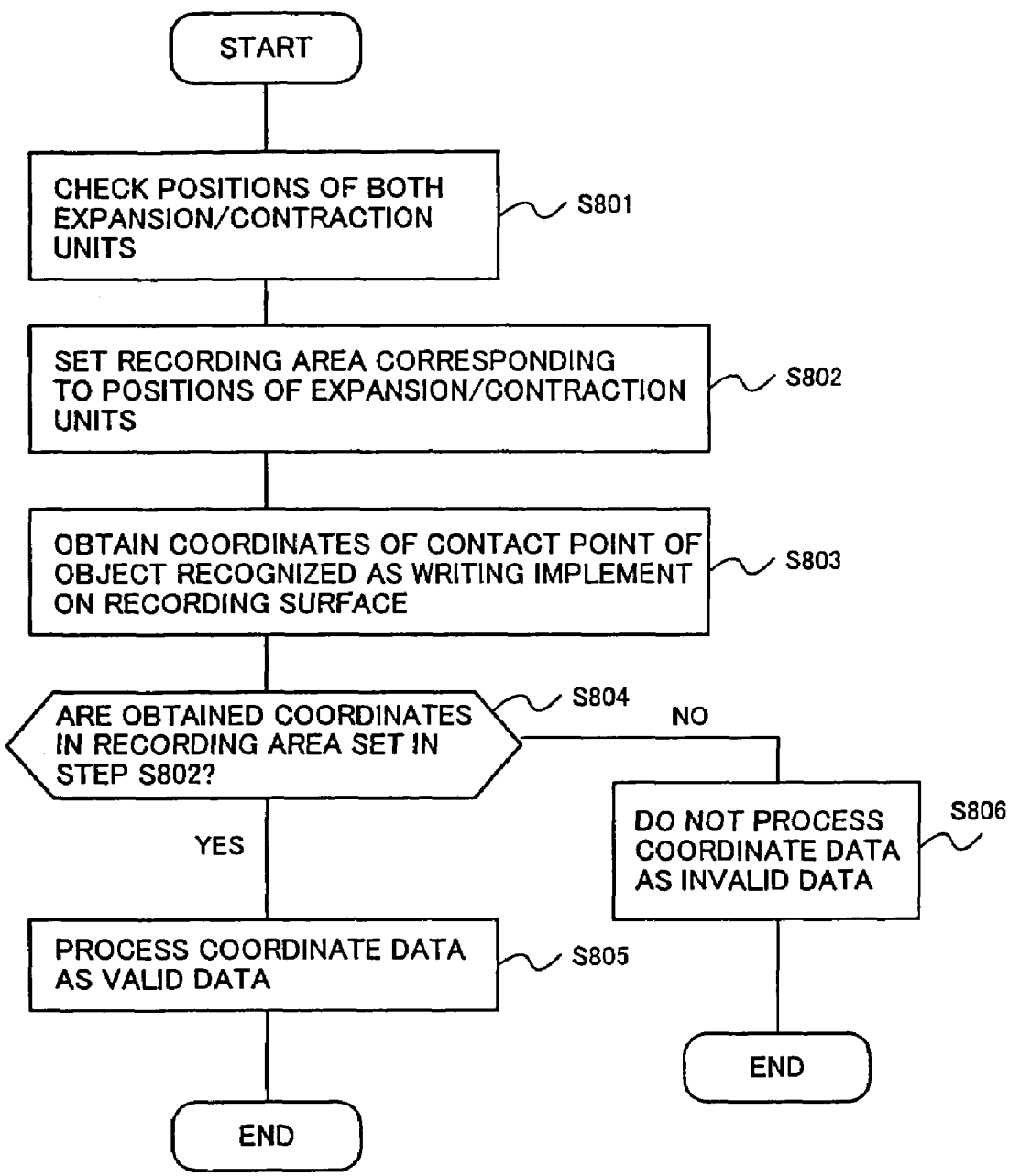
FIG. 21 is a flowchart describing steps performed by the writing input device according to an eighth embodiment of the present invention.

FIG. 21 is a flowchart describing steps performed by the writing input device according to the eighth embodiment of the present invention. At a step S801, the CPU 23 checks a state of expansion/contraction of each of the expansion/contraction units 6 and 7. Subsequently, the CPU 23 selects a size of the recording area 13 corresponding to the state of expansion/contraction of each of the expansion/contraction units 6 and 7 from the above-described four sizes at a step S802. For instance, when both of the expansion/contraction units 6 and 7 have contracted the most, the CPU 23 sets a size of the recording area 13 to the A4 height. At a step S803, the image-processing circuits 17 and 22 obtain coordinates of a contact point of a writing implement contacting the recording surface by performing the steps described in one of the first through fifth embodiments. If the obtained coordinates of the contact point are in the selected recording area at a step S804, the CPU 23 processes data related to the obtained coordinates as valid data at a step S805 similarly to the step S703 shown in FIG. 20. On the other hand, if the obtained coordinates of the contact point are located outside the selected recording area at the step S804, the CPU 23 defines the data related to the obtained coordinates as invalid data, and does not process the data at a step S806. It should be noted that four types of the states of expansion/contraction are provided in the writing input device 1 for setting the size of the recording area 13. However, the number of the states can be increased so that there can be more selections for selecting the size of the recording area 13.

According to the eighth embodiment, since a desired recording area can be selected from a plurality of recording areas whose shapes and sizes are different from each other, operability of the writing input device 1 increases.

A description will now be given of a ninth embodiment of the present invention with reference to FIG. 22. According to the ninth embodiment, before recording information in the recording area 13, a user can set a size of the recording area 13 freely in a range where coordinates of a writing implement can be obtained in addition to predetermined sizes of the recording area 13. In other words, the user can set an area larger than the predetermined sizes of the recording area 13 as the recording area 13.

Figure 22:
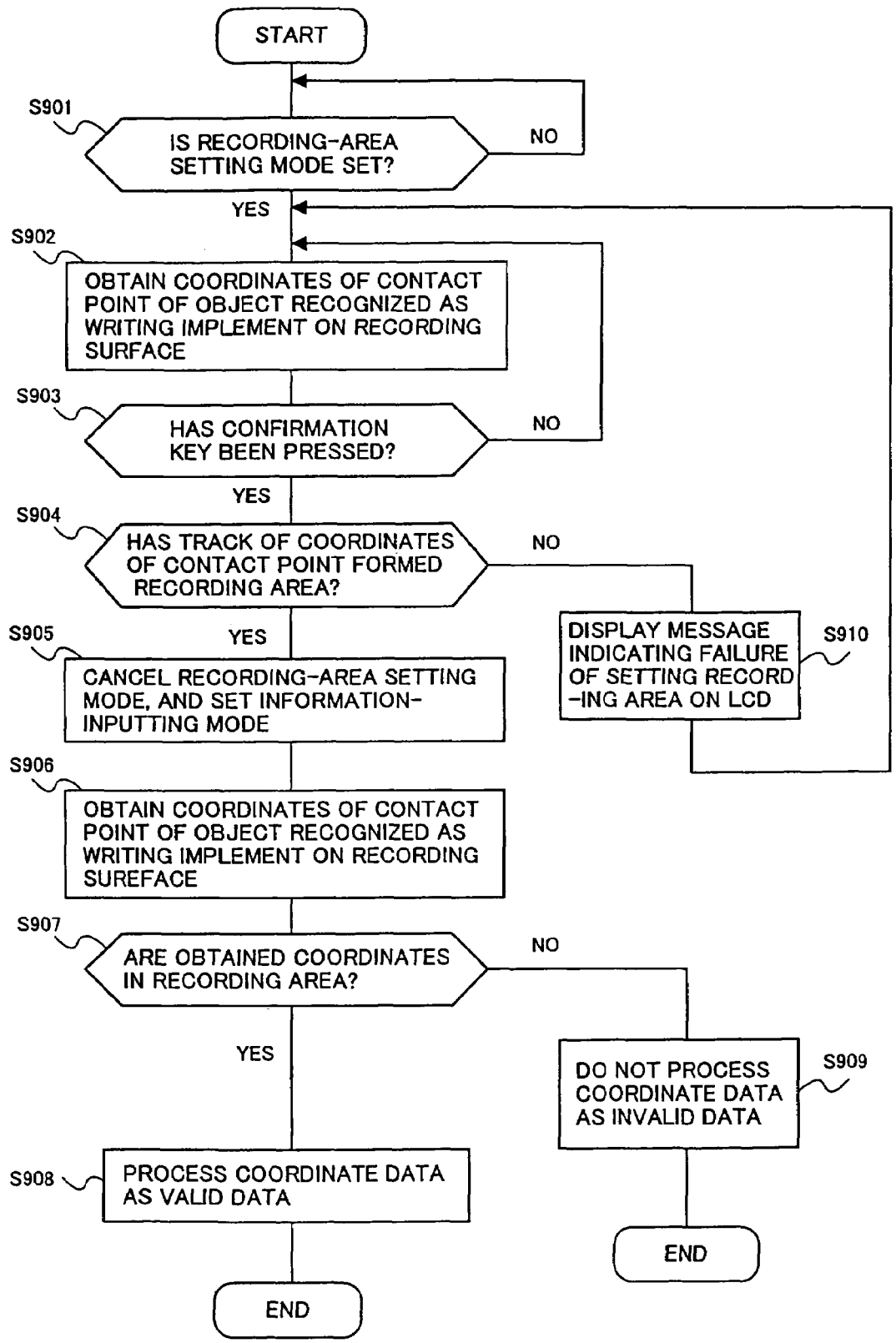
FIG. 22 is a flowchart describing steps performed by the writing input device according to a ninth embodiment of the present invention.

FIG. 22 is a flowchart describing steps performed by the writing input device according to the ninth embodiment of the present invention. When a recording-area setting mode is set at a step S901 by a user operating keys provided in the operation unit 27, the image-processing circuits 17 and 22 process a track of coordinates of a contact point of a writing implement on the recording surface as information used for setting the size of the recording area 13 instead of processing the track as data related to an outline of the writing implement, at a step S902. In the recording-area setting mode, the image-processing circuits 17 and 22 decide whether the track of the coordinates of the contact point forms a closed area. The closed area may be an area whose outline is formed by only the track of the coordinates of the contact point. Alternatively, the closed area may be an area whose outline is formed by a straight line PQ connecting the origin P and the point Q shown in FIG. 19 and the track of the coordinates of the contact point. Furthermore, the closed area may be an area whose outline is formed by straight lines PQ, PR and QS shown in FIG. 23 and the track of the coordinates of the contact point. It should be noted that the straight line PR is drawn perpendicularly to the straight line PQ from the origin P. The straight line QS is drawn perpendicularly to the straight line PQ from the point Q. When a user presses down a confirmation key provided in the operation unit 27 at a step S903 after specifying an area by moving the writing implement on the recording surface, the image-processing circuits 17 and 22 define the area as the recording area 13 at a step S904.

Figure 23:
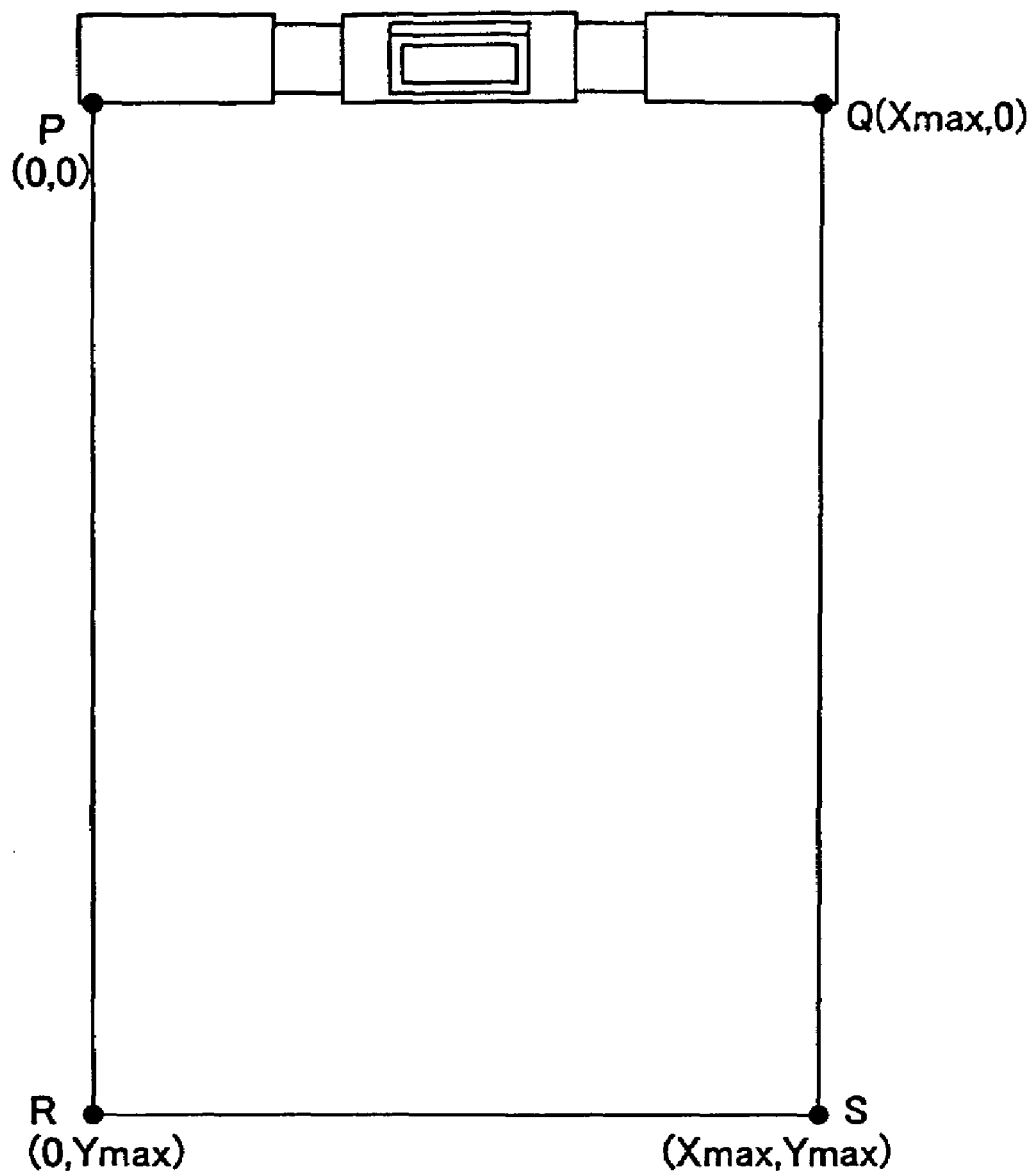
FIG. 23 is a diagram showing the recording area set by a user operation.

For instance at the step S901, by use of the operation unit 27 and a guidance displayed on the LCD 8, a user sets one of recording-area setting modes wherein the straight lines PQ, PR and QS are fixed so that a user can specify only one side RS of a rectangle PQSR as shown in FIG. 23. Subsequently, when a user has pressed down a confirmation key provided in the operation unit 27 at the step S903 after drawing the side RS by use of the writing implement, the image-processing circuits 17 and 22 define the rectangle PQSR as the recording area 13 at the step S904, and store coordinates of each of the points P, Q, R and S as recording-area information in the main memory 25.

After the recording area has been defined at the step S904, the recording-area setting mode is cancelled, and the information-inputting mode is set at a step S905. Steps S906 through S909 correspond to the steps S701 through S704 respectively.

If it is determined that the confirmation key has not been pressed at the step S903, the image-processing circuits 17 and 22 proceed to the step S902. If the recording area 13 could not been formed at the step S904, the CPU 23 displays a message on the LCD 8 at a step S910 to notify a user about failure of the formation of the recording area 13, and proceeds to the step S902.

In the above-described ninth embodiment, the recording area 13 is the rectangle PQSR. However, the writing input device 1 can manage information about the recording area 13 even if the shape of the recording area 13 is a shape other than a rectangle.

Figure 24:
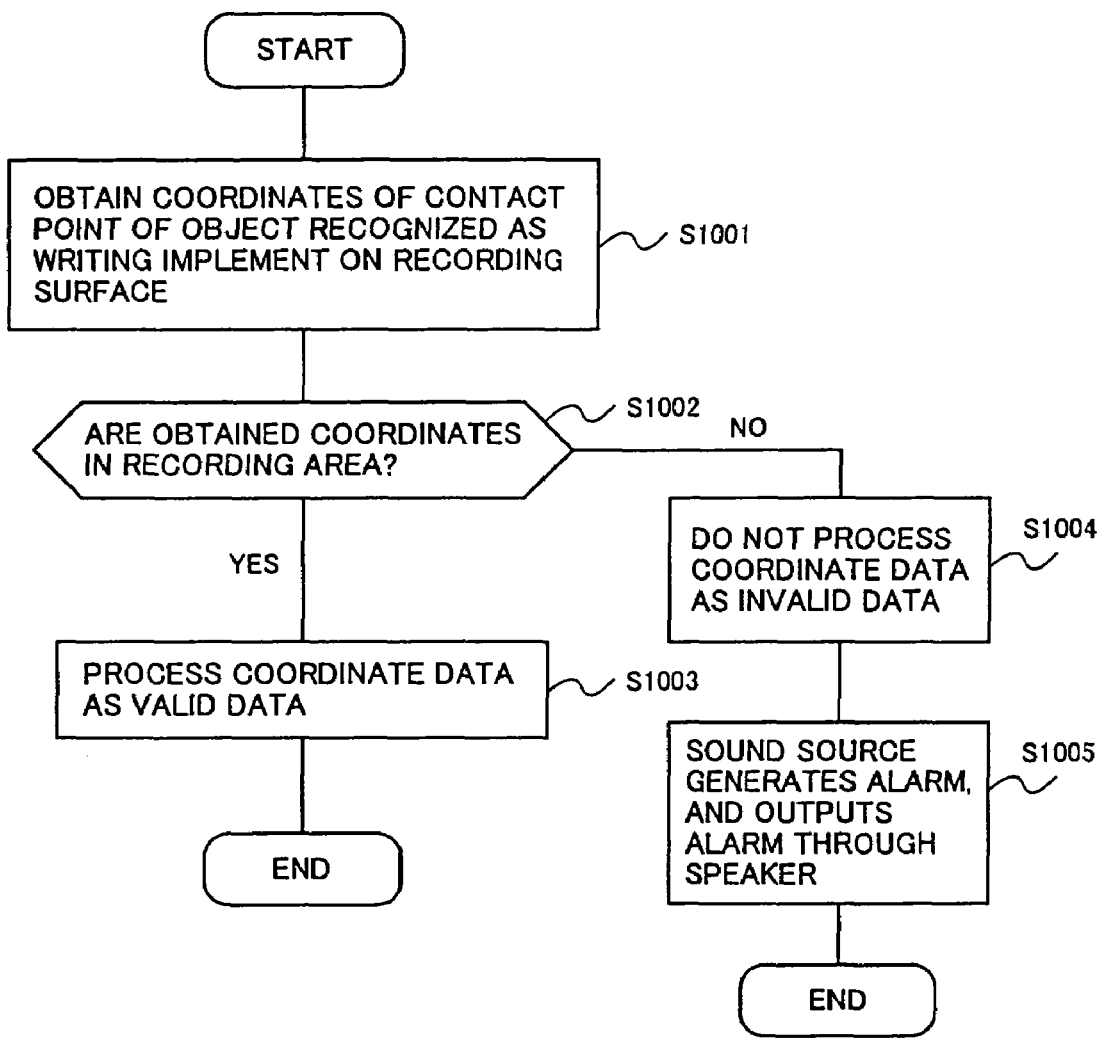
FIG. 24 is a flowchart describing steps performed by the writing input device according to a tenth embodiment of the present invention.

According to a tenth embodiment, when the writing input device 1 detects that a user has written information outside the recording area 13, the writing input device 1 notifies a user that an invalid writing operation has executed by sounding an alarm. FIG. 24 is a flowchart describing steps performed by the writing input device according to the tenth embodiment of the present invention. At a step S1001, the image-processing circuits 17 and 22 obtain coordinates of a contact point of an object that has been recognized as a writing implement in the seventh, eighth and ninth embodiments. Subsequently, at a step S1002, the image-processing circuits 17 and 22 determine whether the contact point of the writing implement is in the recording area 13. If it is determined at the step S1002 that the contact point is in the recording area 13, the writing input device 1 processes data related to the obtained coordinates as valid data at a step S1003. If it is determined at the step S1002 that the contact point is located outside the recording area 13, the writing input device 1 does not process coordinate data of the contact point at a step S1004. Additionally, at a step S1005, the writing input device 1 outputs an alarm signal from the sound source 30 to the speaker 32 wherefrom an alarming sound is outputted. According to the tenth embodiment, a user can easily identify the recording area 13 even in a case that a recording sheet such as paper is not used as the recording area 13. In other words, even in a case that the recording area 13 is hardly determined because of a recording surface being a desk or a wall, a user can write information in the recording area 13 smoothly and correctly.

In an eleventh embodiment, a frame is provided on the edge of the recording area 13 so that a user can easily notice a range of the recording area 13. Additionally, from an image photographed by the left camera unit 2 and the right camera unit 3, the image-processing circuits 17 and 22 do not detect a contact point of a writing implement on a recorded material such as paper in an area outside the recording area 13 where the contact point is behind the frame, thereby reducing the load on the writing input device 1 to execute image processes.

In a case that the image-processing circuits 17 and 22 extract an outline of an object from an image photographed by the left camera unit 2 and the right camera unit 3, a larger contrast of the object and its surrounding area produces a higher accuracy in extracting the outline of the object. In other words, a larger difference in luminance of the object and its surrounding area produces a higher accuracy in extracting the outline of the object. If a writing implement is specified, a background color of the image photographed by the left camera unit 2 and the right camera unit 3 can be set to a color which is the most appropriate to a color of the writing implement. However, if the color of the writing implement is not specified, the background color of the image should be set to a color by which objects with various colors can be easily extracted from the image. For instance, it is assumed that a finger is used as a writing implement. In such case, when the finger is photographed under a regular room light, luminance of the finger is closer to luminance of a white subject than to that of a black subject having the lowest luminance. Accordingly, in the eleventh embodiment, a color of the inner surface of the frame provided on the edge of the recording area 13 is set to black, thereby increasing accuracy in recognizing a shape of an unspecified writing implement and detecting coordinates of a contact point of the unspecified writing implement on a recorded material.

Figure 25:
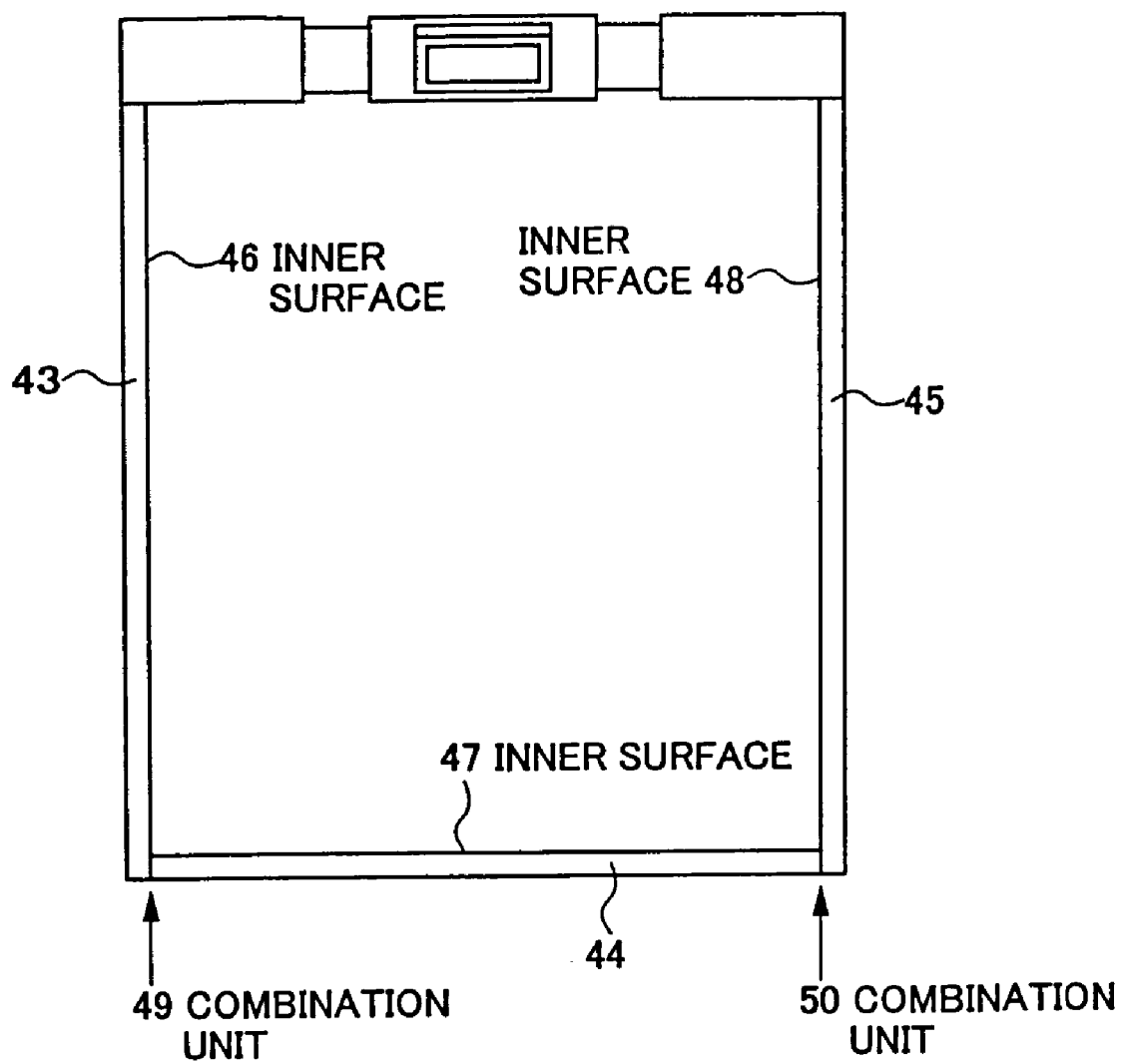
FIG. 25 is a block diagram showing the recording area created by use of a frame.

In a case that a sheet of paper and the like are not used as the recording area 13, a frame is provided on the edge of the recording area 13 so that a user can easily distinguish the recording area 13. As shown in FIG. 25, a frame made of a plastic and the like includes three bars 43, 44 and 45. The three bars 43, 44 and 45 can be combined or separated by use of combination units 49 and 50. Shapes of the combination units 49 and 50 are existing shapes. A height of the frame from the recording surface should be set high enough not to be able to recognize a state in which an object recognized as a writing implement is contacting the recording surface outside the recording area 13. By providing such a frame on the edge of the recording area 13, a recognition process of a contact point of the object on the recording surface outside the recording area 13 cannot be executed, thereby sharply reducing an amount of processes performed by the writing input device 1. Additionally, by setting a color of inner surfaces 46, 47 and 48 of the above-described bars 43, 44 and 45 to black, and further by using materials having low light-reflectance as materials used for creating the bars 43, 44 and 45, accuracy in recognizing a shape of an unspecified writing implement and detecting coordinates of a contact point of the unspecified writing implement on the recording surface is increased.

A description will now be given of a twelfth embodiment of the present invention. An amount of electric charge stored in each pixel on a CMOS image sensor in a unit time by photoelectric conversion depends on an amount of light irradiated onto an imaging device. In other words, the amount of electric charge stored in each pixel by the photoelectric conversion in a unit time increases as an amount of incident light to the imaging device increases, and thus a frame rate outputted as image signals can be increased. In addition, a user writes information on a recorded material occasionally in a place where a lighting environment is insufficient. Accordingly, in the twelfth embodiment, accuracy in recognizing a shape of a writing implement and detecting a contact point of the writing implement on the recorded material is increased by irradiating light against the recording area 13 located on the recorded material. When the writing input device 1 is powered on, the LED 9, the LED 10, the LED 11, and the LED 12 are supplied with electric current, and turned on. Consequently, the amount of incident light irradiated to the CMOS image sensors 16 and 21 increases. Thus, the amount of electric charge stored in each pixel by the photoelectric conversion in a unit time increases so that a frame rate outputted as image signals can be increased.

Accordingly, accuracy in recognizing a shape of an unspecified writing implement and detecting coordinates of a contact point of the unspecified writing implement on a recording surface can be increased. The twelfth embodiment becomes very effective especially in a case that the writing input device 1 is used in a place where the lighting environment is insufficient. The description has been given of the twelfth embodiment in which each LED is turned on when the writing input device 1 is powered on. Alternatively, each LED in the writing input device 1 may be supplied with a switch, and may be turned on when a switch corresponding the LED is pressed down.

In a thirteenth embodiment, in a case that a resolution of reading coordinates is low, by setting an entire reading area (the recording area 13) as a part of a page of a data area, written data such as letters inputted by use of a writing implement is combined with a page of written data, and is displayed on an image-display unit, or is stored as a file. Additionally, in a case that a small image-display device that can only display a small number of pixels is used as an image-display device for displaying the written data, the thirteenth embodiment enables displaying images on the image-display device by dividing a page of the data area with a large number of pixels, and writing information in the divided data area. In other words, since a page of the data area is divided into a plurality of blocks, wherein one of the blocks is assigned to a recording area, a page of written data can be created by inputting information in the recording area a number of times even if a resolution of reading information written in the recording area is low.

A range of the recording area is limited to an area where a writing implement can be recognized, as shown in FIG. 4. However, in the thirteenth embodiment, a description will be given of a case that the recording area is set to a letter (A4) size including the points P, Q, R and S as corners of the recording area as shown in FIG. 23. The point P is the origin of coordinates of contact points of a writing implement in the recording area. The point Q is placed at the end of an X-axis drawn from the origin P. A distance between the points P and Q is set to a shorter side (width) of the A4 size by use of the extraction/contraction units 6 and 7 shown in FIG. 2 by a hand operation. In addition, the distance between the points P and Q is displayed in millimeters on the LCD 8. If the distance between the points P and Q is equal to a width of a fixed sheet size, the LCD 8 displays letters such as "A4 width" and "B4 width". Accordingly, a user can check a width of the recording area while writing information in the recording area since a distance between the left camera unit 2 and the right camera unit 3 is displayed in millimeters or by a sheet size on the LCD 8.

A description will now be given of a method of managing written data. The written data is managed by a page having a fixed size. A recording area can be set to any size so that a size of the page can be set to any value. In the thirteenth embodiment, it is assumed that a data size (the number of pixels) of the page is set to an A4 data size (the number of pixels). The number of pixels included in the page is set to an 864-pixel width by an 1140-pixel length based on an ITU-T T.4 related to a document of a group-3 facsimile device. The above-described size of the page is equivalent to 100 dpi (dot per inch) in the width and the length of the page. A page of written data or a plurality of pages of written data may be stored as one file in the flash memory 26.

The description has been given of the method of obtaining coordinates of contact points or writing positions of a writing implement by using the equations EQ1 through EQ4 when units are placed in positions shown in FIG. 6. In the method, the only variable parameter used for obtaining the coordinates is the angle $\theta$ shown in the equation EQ1, or the distance "h" between an image-formed location of the optical axis of a wide-angle lens and an image-formed location of a writing position on a CMOS image sensor.

Figure 26:
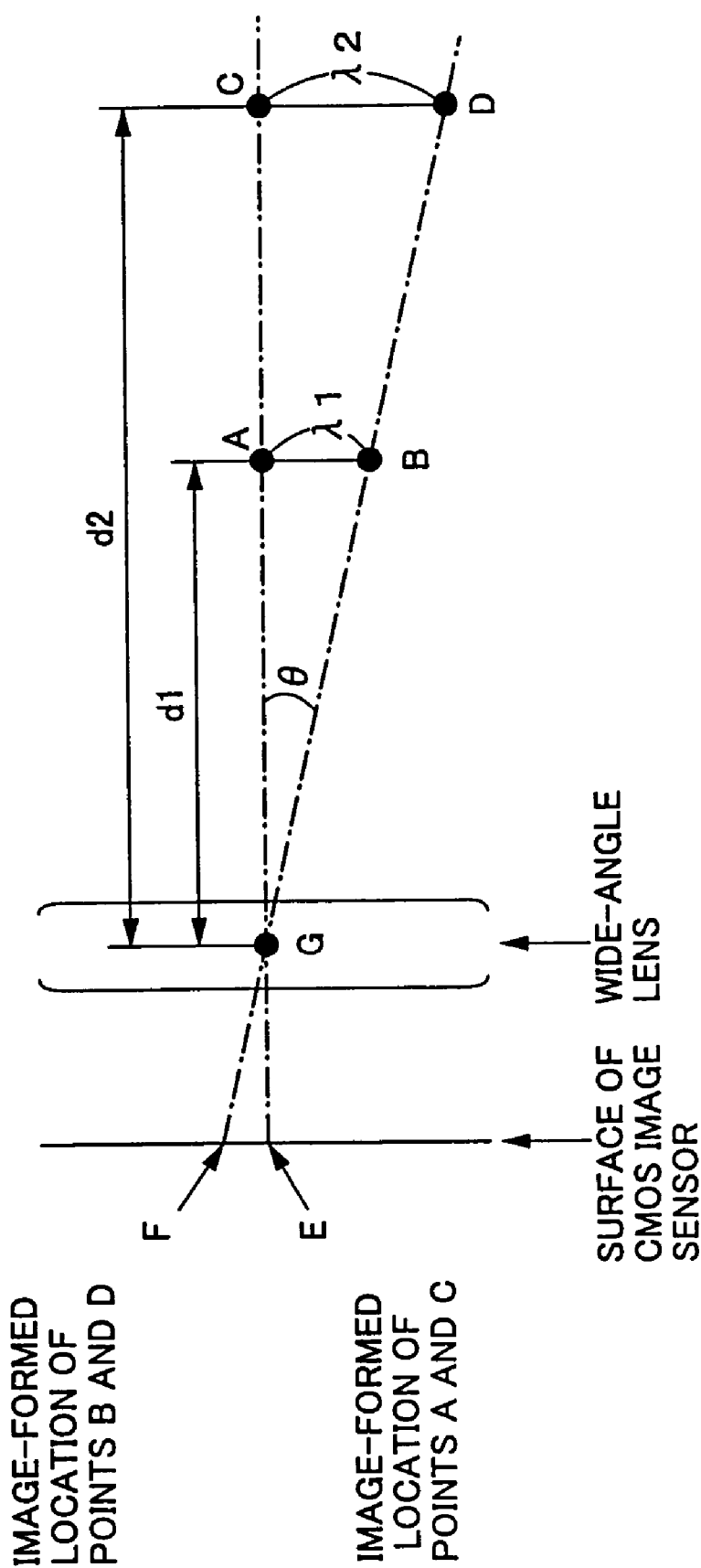
FIG. 26 is a diagram used for describing that a resolution of reading information written in the recording area varies depending on a distance from the camera unit.

In the above-described method, a resolution of reading information written at the writing position depends on a distance measured from the writing position to the left camera unit 2 or to the right camera unit 3. A concrete description will be given of a relation between the distance and the resolution with reference to FIG. 26. FIG. 26 shows positions of a CMOS image sensor, a wide-angle lens, writing positions (writing points) A, B, C and D. It is assumed that the points A and C are placed on the optical axis of the wide-angle lens for a description purpose. A point E is an image-formed location of the points A and C, and is on a surface of the CMOS image sensor. A point F is an image-formed location positioned at a pixel adjacent to a pixel corresponding to the point E. The points B and D are placed at certain points so that an image of a subject placed at the point B or D can be formed at the point F. It is assumed that angles between lines AB and AE, and between lines CD and CE are 90 degrees. Additionally, a cross section of the line AE and a line BF is named a point G. By setting an angle between lines AG and BG, or between CG and DG as an angle θ, a length of the line AG as a length d1, a length of the line CG as a length d2, a length of the line AB as a length λ1, and a length of the line CD as a length λ2, the lengths λ1 and λ2 are obtained by the following equations.

$$\lambda 1 = d1 * \tan\theta \qquad \text{EQ5}$$

$$\lambda 2 = d2 * \tan\theta \qquad \text{EQ6}$$

It is obvious from the above equations EQ5 and EQ6 that distance ranges λ1 and λ2 of a subject photographed by pixels E and F (pixels where the points E and D are located), which are adjacent to each other on the surface of the CMOS image sensor, vary depending on the distances d1 and d2 from the wide-angle lens. The pixels E and F photograph the subject located at the distance d1 from the point G in the range λ1. On the other hand, the pixels E and F photograph the subject located at the distance d2 from the point G in the range λ2. This indicates that accuracies in reading coordinates of the writing position are the same in a case of writing information from the point A to the point B and in a case of writing information from the point C to the point D.

A resolution measured in dpi of reading the coordinates of the writing position on the line AB is obtained by dividing one inch that is a unit length by the distance λ1 (inch). In addition, a resolution of reading the coordinates of the writing position on the line CD is obtained by dividing one inch by the distance λ2 (inch). In a case that the number of pixels that can be read by one of the left camera unit 2 and the right camera unit 3 in a horizontal direction of the CMOS image sensors 16 and 21, that is, a direction parallel to the recording surface 38 in a photographed image shown in FIG. 9, is 640 pixels, a resolution of reading coordinates at the points R and S is about 28 dpi in an A4-sized recording area shown in FIG. 23. Additionally, a resolution of reading coordinates at the center of the A4-sized recording area is about 56 dpi. As described above, the closer to the left camera unit 2 and the right camera unit 3 the writing position is in the recording area, the more densely the coordinates are read by the CMOS image sensors 16 and 21. On the contrary, the farther from the left camera unit 2 and the right camera unit 3 the writing position is in the recording area, the more roughly the coordinates are read by the CMOS image sensors 16 and 21.

Figure 27:
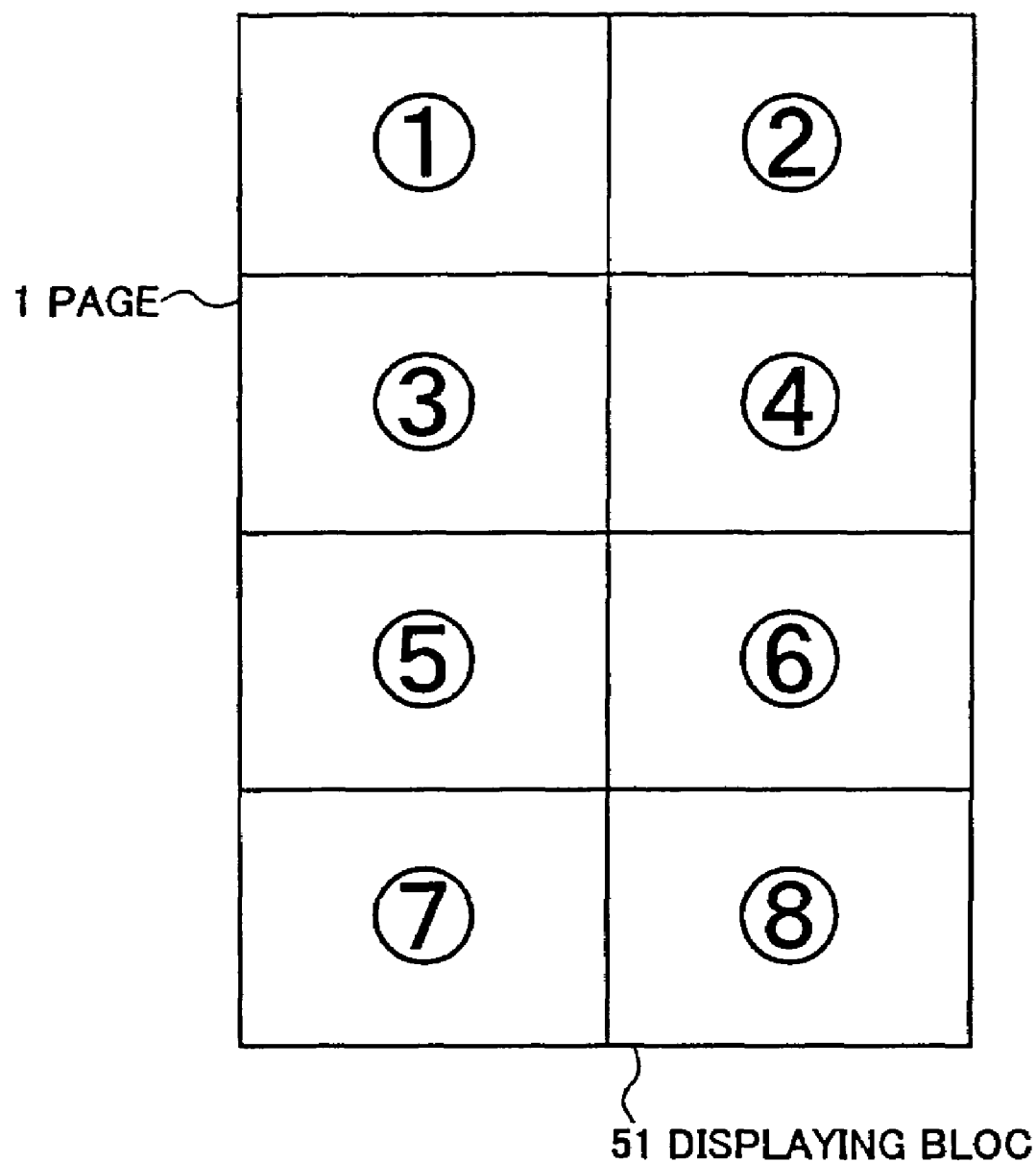
FIG. 27 is a block diagram showing a method of dividing a page of a data area into displaying blocks.
Figure 28:
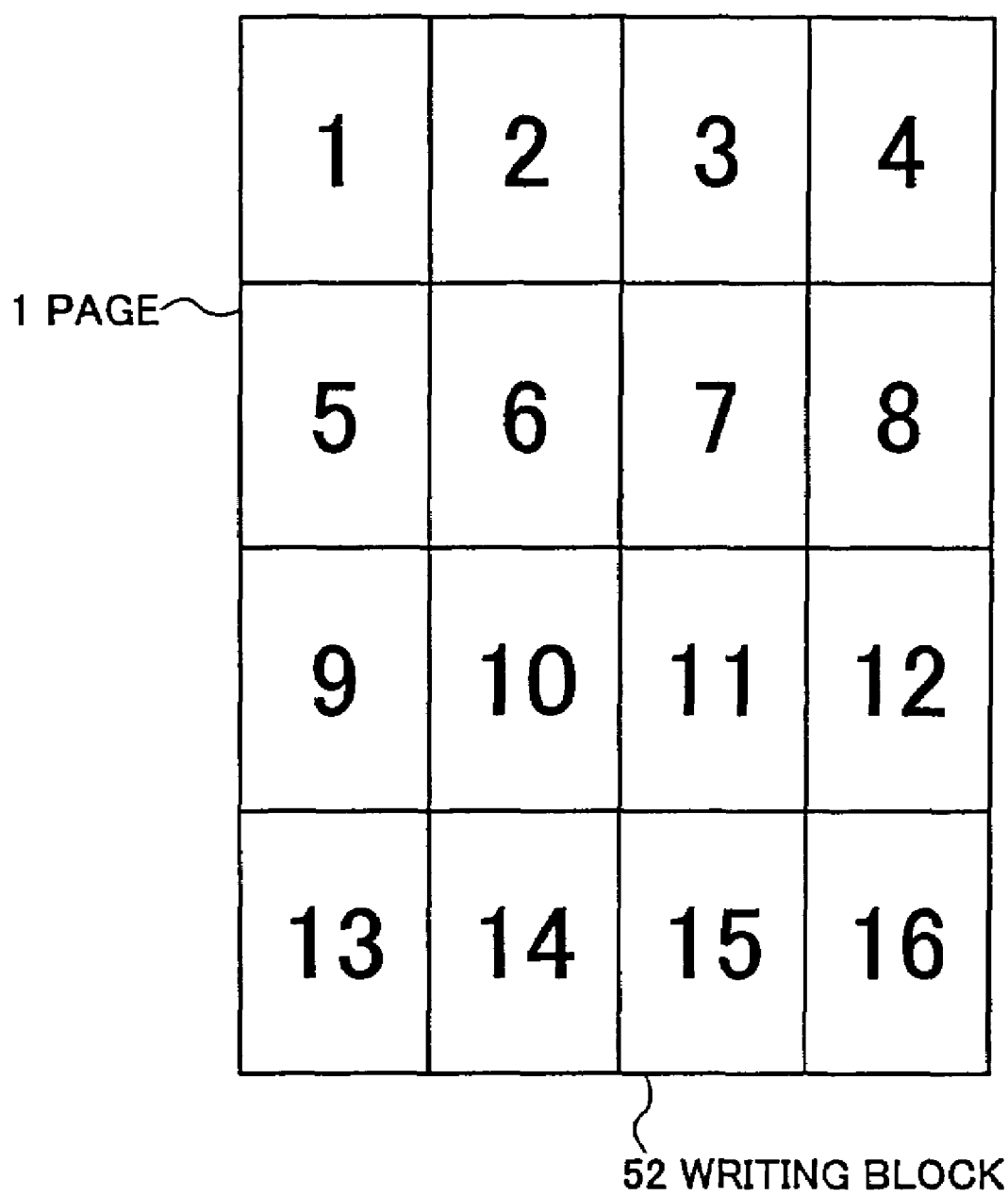
FIG. 28 is a block diagram showing a method of dividing a page of the data area into writing blocks.
Figure 29:
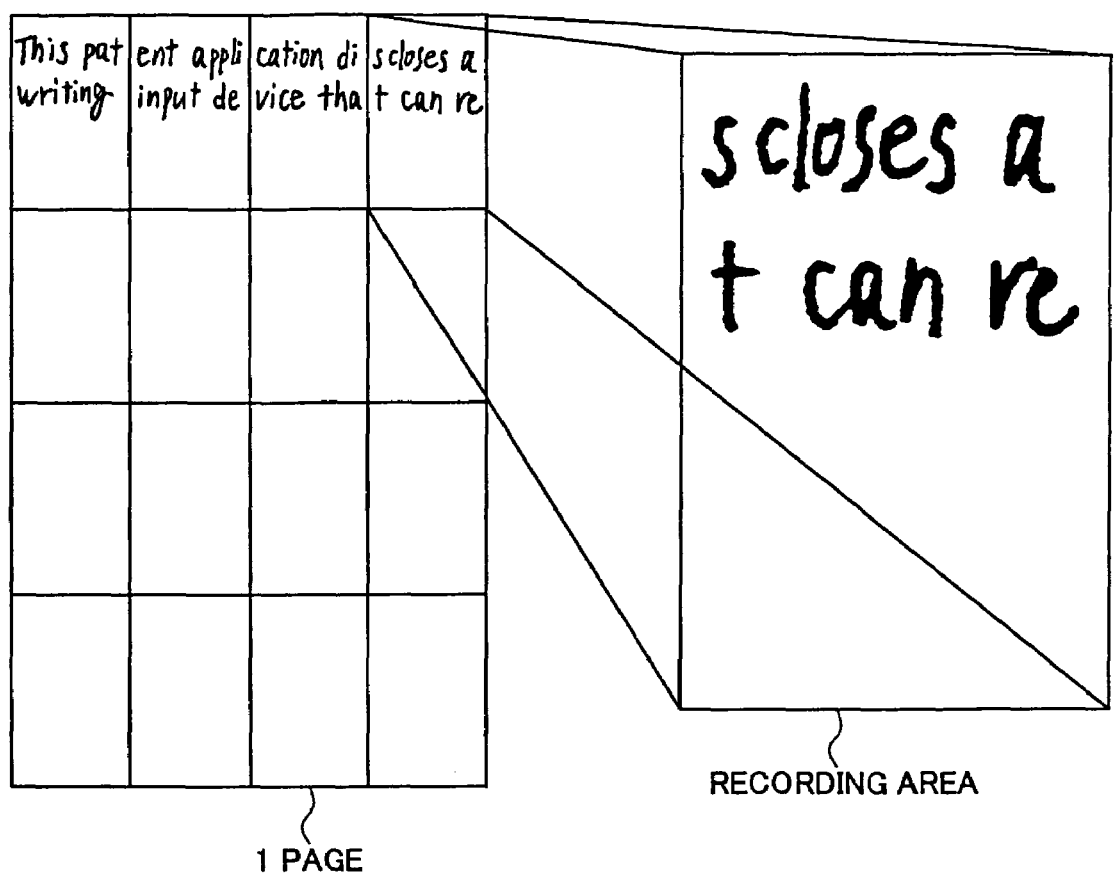
FIG. 29 is a block diagram showing a relation between a page of the data area and the recording area.

Now, it is assumed that the LCD 8 can display 432 pixels in the horizontal direction and 285 pixels in the vertical direction. In a case of displaying a page of written data whose size is the 864-pixel width by the 1140-pixel length on the LCD 8, the page must be divided into several blocks. FIG. 27 is a block diagram showing an embodiment of a method to divide the page of written data. As shown in FIG. 27, the number of pixels included in the page of written data is divided by the number of pixels displayed on the LCD 8 into eight displaying blocks 51. In other words, the number of pixels in each of the divided displaying blocks 51 is equal to the number of pixels displayed on the LCD 8. This displaying block 51 (432×285 pixels) is separated into a left block and a right block, each of the left and the right blocks having the size of 216×285 pixels. Subsequently, each of the left and right blocks is named a writing block 52, and is assigned to the A4-sized recording area shown in FIG. 23 to fit to the A4 size. FIG. 28 shows an embodiment in which a page of written data is divided into a plurality of the writing blocks (recording areas) 52. A size of the writing block 52 is exactly equal to a half of the displaying block 51 so that a page of written data is evenly divided into sixteen blocks. FIG. 29 shows a relation between a page of written data and the recording area in a case of writing information in a fourth writing block (a fourth recording area) shown in FIG. 28. A size of a recording area shown in FIG. 29 is a letter size (A4). In addition, the recording area is provided with paper whereon a line of letters is written by use of a pen.

Figure 30:
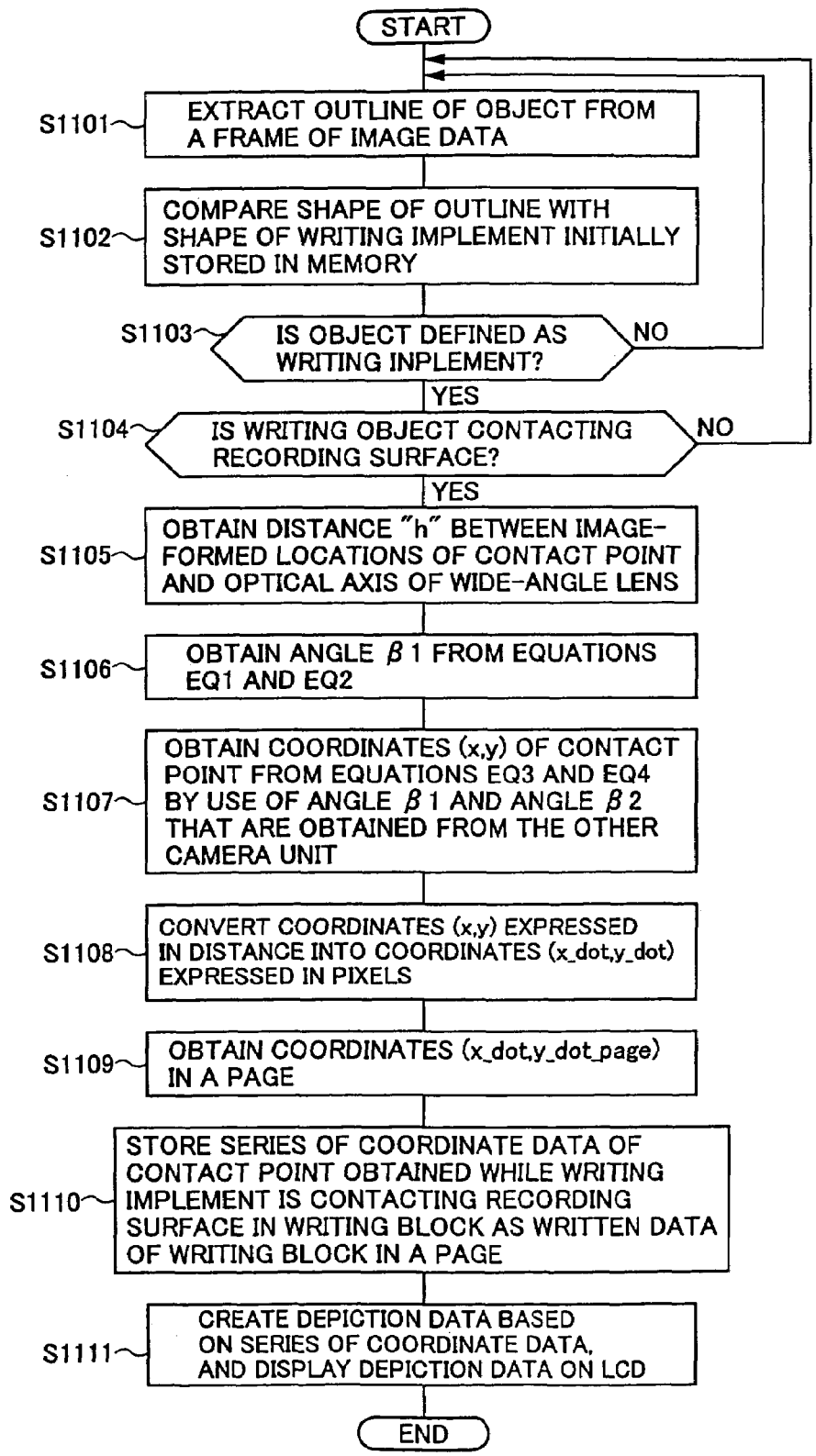
FIG. 30 is a flowchart describing steps performed by the writing input device according to a thirteenth embodiment of the present invention.

A description will now be given of processes performed in the thirteenth embodiment in a case of writing information in one of the writing blocks 52 created as described above. FIG. 30 is a flowchart describing steps performed by the writing input device according to the thirteenth embodiment of the present invention. Steps S1110 through S1107 are executed similarly to the steps S101 through S107 of the first embodiment shown in FIG. 8 in order to obtain coordinates (x, y) of a contact point of a writing implement on a recording surface. A unit of the coordinates (x, y) is the same as a unit of the distance L shown in FIG. 6, and is millimeters in the thirteenth embodiment. Since the size of the writing block 52 is exactly 1/16 of the size of a page of written data, the coordinates (x, y) of the contact point (writing position) in the recording area are expressed in the numbers of pixels counted from the origin of the page in an X-axis direction and in a Y-axis direction. Initially, assuming a resolution of reading coordinates (an interval of reading coordinates) is even throughout the recording area (the writing block 52), coordinates (x_dot, y_dot) expressed in pixels are calculated from the coordinates (x, y) expressed in millimeters in one of the writing blocks 52 by use of the following equations at a step S1108.

$$x\_dot = x/(\text{an interval of recording coordinates in the } x\text{-axis direction}) \qquad \text{EQ7}$$

$$y\_dot = y/(\text{an interval of recording coordinates in the } Y\text{-axis direction}) \qquad \text{EQ8}$$

Subsequently, by setting the top left corner of a page of written data as the origin of the page, an origin of an "n"th writing block 52 can be expressed as coordinates (x_org(n), y_org(n)). A range of the value "n" is from 0 to 15. At a step S1109, coordinates (x_dot_page, y_dot_page) of the writing position in a page of written data are obtained from the following equations.

$$x\_dot\_page = x\_org(n) + x\_dot \qquad \text{EQ9}$$

$$y\_dot\_page = y\_org(n) + y\_dot \qquad \text{EQ10}$$

The writing input device 1 manages the coordinates (x_dot_page, y_dot_page) expressed in pixels as written data. For instance, in a case that information is written at coordinates (100, 200) in a tenth writing block, coordinates (100, 200) in the tenth writing block are converted into coordinates (316, 770) in a page. It should be noted that coordinates of the origin of the tenth writing block are (216, 570).

At a step S1110, the CPU 23 stores a series of coordinate data of a contact point that has been obtained while the writing implement was contacting the recording surface in one of the writing blocks in a memory as written data of the writing block in a page of written data. In addition, the CPU 23 creates depiction data from the series of the coordinate data by use of a method of connecting each set of coordinates with a straight line, for example, and displays the depiction data on the LCD 8 through the LCD display-control unit 28 at a step S1111.

It is assumed in the thirteenth embodiment that the resolution of reading coordinates is even throughout the entire recording area when obtaining the coordinates (x_dot, y_dot) expressed in pixels in order to simplify the description. However, in reality, the resolution of reading the coordinates varies depending on a distance from the left camera unit 2 or the right camera unit 3 to the coordinates (x_dot, y_dot). A method of making a pixel density of written data even throughout the entire recording area will be described later in other embodiments.

Additionally, the following equations EQ11 and EQ12 can be substituted for the equations EQ7 and EQ8 for obtaining the coordinates (x_dot, y_dot) expressed in pixels from the coordinates (x, y).

$$x\_dot = 864 \times (x/215) \times (1/4) \qquad \text{EQ11}$$

$$y\_dot = 1140 \times (y/290) \times (1/4) \qquad \text{EQ12}$$

The equations EQ11 and EQ12 are derived from the following facts. The numbers of pixels in the width and the length of a page of written data are respectively 864 pixels and 1140 pixels. The width and the length of the page are respectively 215 millimeters and 290 millimeters. In addition, the width and the length of one of the writing blocks corresponding to the recording area are ¼ of the width and the length of the page respectively.

In a fourteenth embodiment of the present invention, the recording area is assigned to any area in a page of a data area. Additionally, in a case that the resolution of reading coordinates in the recording area is low, a page of written data is created by writing data in the recording area several times. In other words, in the above-described thirteenth embodiment, the description has been given of the method of dividing the number of pixels in a page of the data area into 8 blocks, displaying one of the blocks on the LCD 8, and assigning half of a block to the recording area. On the other hand, in the fourteenth embodiment, a description will be given of a method of assigning a pixel-displaying area of the LCD 8 to any area in a page of the data area, and then assigning a part of the pixel-displaying area to the recording area. Similarly to the thirteenth embodiment, the LCD 8 can display 432 pixels in the horizontal direction and 285 pixels in the vertical direction. A location of the pixel-displaying area of the LCD 8 can be moved freely to any location in a page of the data area by a user operation. A method of moving the pixel-displaying area of the LCD 8 will be described later in other embodiments.

Figure 31:
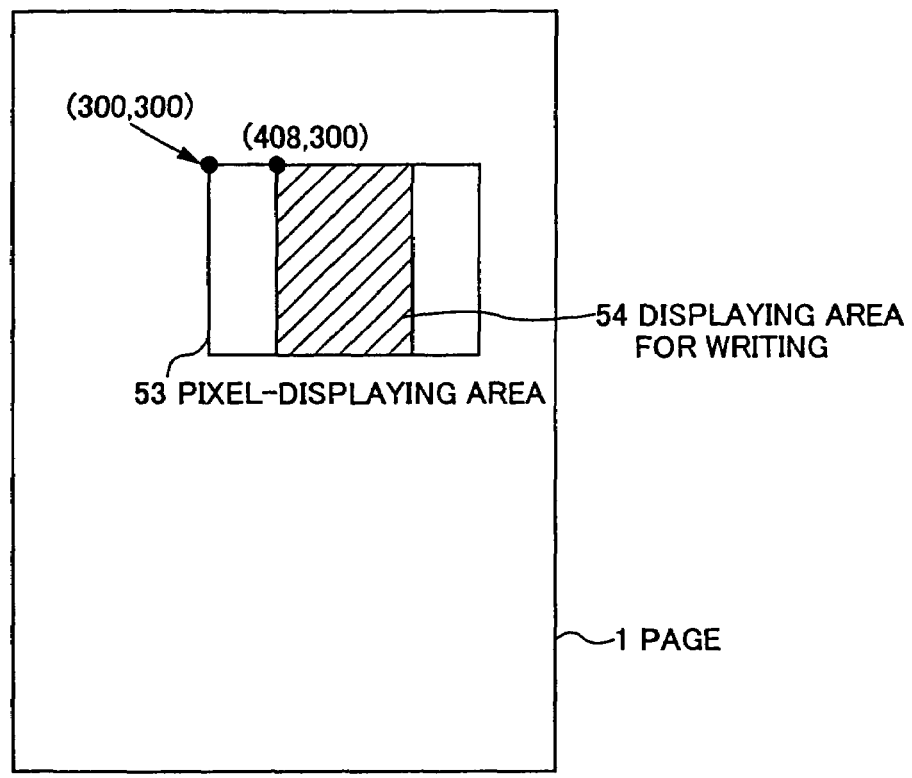
FIG. 31 is a block diagram showing a method of assigning a pixel-displaying area and a displaying area for writing to desired locations in a page of the data area.

FIG. 31 is a block diagram showing an embodiment of a pixel-displaying area 53 of the LCD 8 in a page of the data area. FIG. 31 further includes a displaying area 54 for writing that is a 216 pixel by 285 pixel shaded area located at the center of the pixel-displaying area 53. In other words, coordinates of the origin (the top left corner) of the pixel-displaying area 53 are (300, 300) in FIG. 31. Additionally, coordinates of the origin of the displaying area 54 for writing are (408, 300). In the same manner as the thirteenth embodiment, the coordinates (x, y) of a contact point (a writing position) of a writing implement contacting a recording surface are obtained. Subsequently, the coordinates (x, y) are converted to the coordinates (x_dot, y_dot) expressed in pixels by use of the equations EQ7 and EQ8. Assuming that the top left corner of a page of the data area is the origin, coordinates of the starting point of the recording area, that is, the top left corner of the recording area, expressed in pixels are named coordinates. (x_org, y_org). Coordinates (x_dot_page, y_dot_page) of the writing position in a page of the data area are expressed as below.

$$x\_dot\_page = x\_org + x\_dot \qquad \text{EQ13}$$

$$y\_dot\_page = y\_org + y\_dot \qquad \text{EQ14}$$

For example, if data is written at coordinates (100, 200) in the displaying area 54 for writing shown in FIG. 31, the coordinates (100, 200) in the displaying area 54 for writing are converted to coordinates (508, 500) in a page of the data area. The writing input device 1 manages the coordinates (x_dot_page, y_dot_page) expressed in pixels as written data.

As described above, the fourteenth embodiment is characterized by the function to assign the pixel-displaying area 53 to any location in a page of the data area. After a location of the pixel-displaying area 53 has been set in a page of the data area, the steps S1110 and S1111 shown FIG. 30 of the thirteenth embodiment are executed. It should be noted that a displaying area for writing is substituted for a writing block in the step S1110 in the fourteenth embodiment. According to the fourteenth embodiment, the recording area is assigned to a desired area in a page of the data area so that the writing input device 1 can create and manage a page of written data that includes a large number of pixels by writing data in the recording area a plurality of times even in a case that the resolution of reading coordinates is low in the recording area. Additionally, operability of the writing input device 1 increases when a user writes data in the desired area of a page of the data area.

Figure 32A:
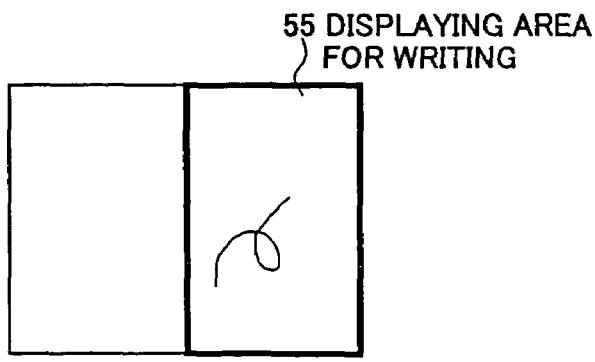
FIG. 32A and 32B are diagrams showing an accentuated displaying area for writing.
Figure 32B:
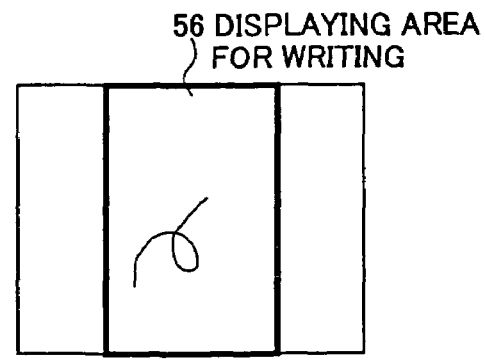

In a fifteenth embodiment, an area corresponding to a recording area is displayed on a displaying unit distinctively so that a user can recognize easily which part of a page of a data area he or she is currently writing data in, thereby improving operability of the writing input device 1. In the above-described thirteenth embodiment, in a case that a writing block corresponding to the recording area is displayed on a monitor of the LCD 8, the writing block is displayed in the right or left half of a displaying block as shown in FIGS. 27 and 28. On the other hand, in the fourteenth embodiment, a displaying area for writing that corresponds to the recording area is displayed at the center of the monitor of the LCD 8, as shown in FIG. 31. In the fifteenth embodiment, a border of the displaying area for writing is accentuated on the monitor of the LCD 8 in order for a user to easily distinguish the displaying area for writing. FIG. 32A shows an embodiment corresponding to the thirteenth embodiment of an emphasized displaying area 55 for writing on the monitor of the LCD 8. FIG. 32B shows an embodiment corresponding to the fourteenth embodiment of an emphasized displaying area 56 for writing on the monitor of the LCD 8.

In a sixteenth embodiment, a description will be given of a method of displaying an area corresponding to a recording area on a displaying unit distinctively so that a user can recognize easily which part of a page of a data area he or she is currently writing data in, thereby improving operability of the writing input device 1. In the thirteenth embodiment, the size of a writing block is set to exactly 1/16 of the size of a page of the data area as shown in FIG. 28. In such case, it is convenient to recognize a location of a writing block corresponding to a current recording area by displaying the location of the writing block with locations of all the writing blocks. Accordingly, a block-location displaying key is provided in the operation unit 27 for displaying the writing block on the LCD 8.

Figure 34:
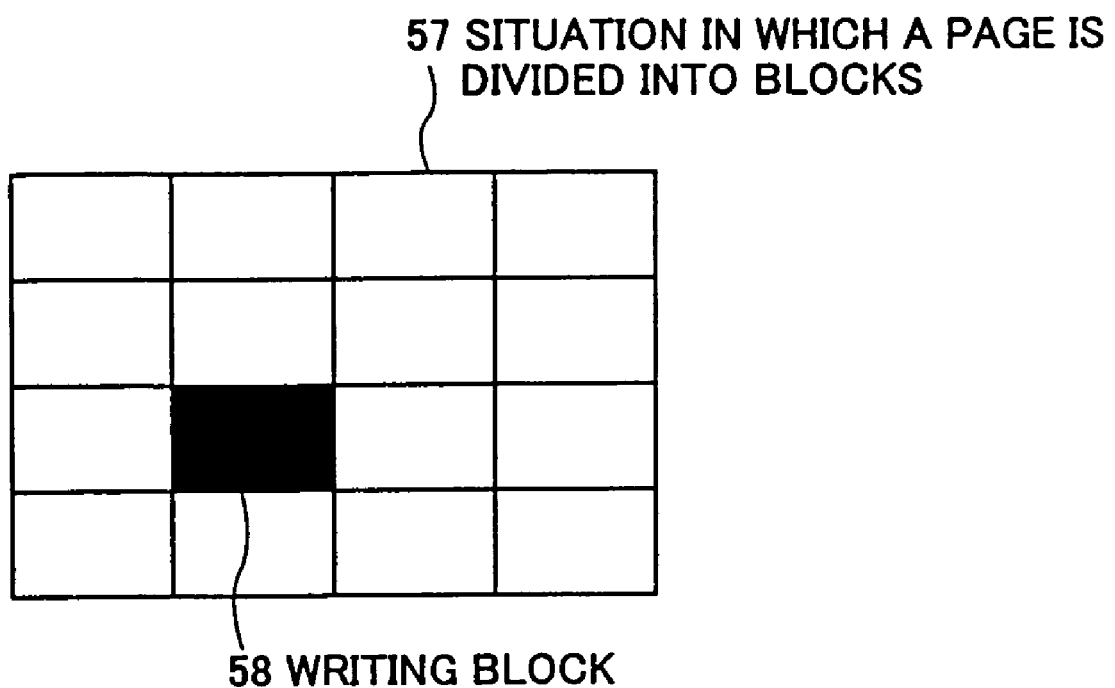
FIG. 34 is a diagram showing a location of a writing block displayed on a LCD.

FIG. 33 is a flowchart describing steps performed by the writing input device according to the sixteenth embodiment of the present invention. At a step S1201, the writing input device 1 checks whether the block-location displaying key has been pressed. If it is determined at the step S1201 that the block-location displaying key has been pressed, a situation 57 in which a page is divided into blocks is displayed on the LCD 8, wherein a location of a writing block 58 is specified. In FIG. 34, the location of the writing block 58 (a writing block 10) is displayed with its luminance being inverted from other blocks in a page of the data area, at a step S1202. If it is determined at a step S1203 that the block-location displaying key has been pressed again, the LCD 8 displays image data that had been displayed previously before the situation 57 was displayed thereon, for instance, a screen shown in FIG. 32A or FIG. 32B, at a step S1204. According to the sixteenth embodiment of the present invention, an area corresponding to the recording area is displayed on the displaying unit distinctively so that a user can recognize easily which part of a page of the data area he or she is currently writing data in, thereby improving operability of the writing input device 1.

Figure 35:
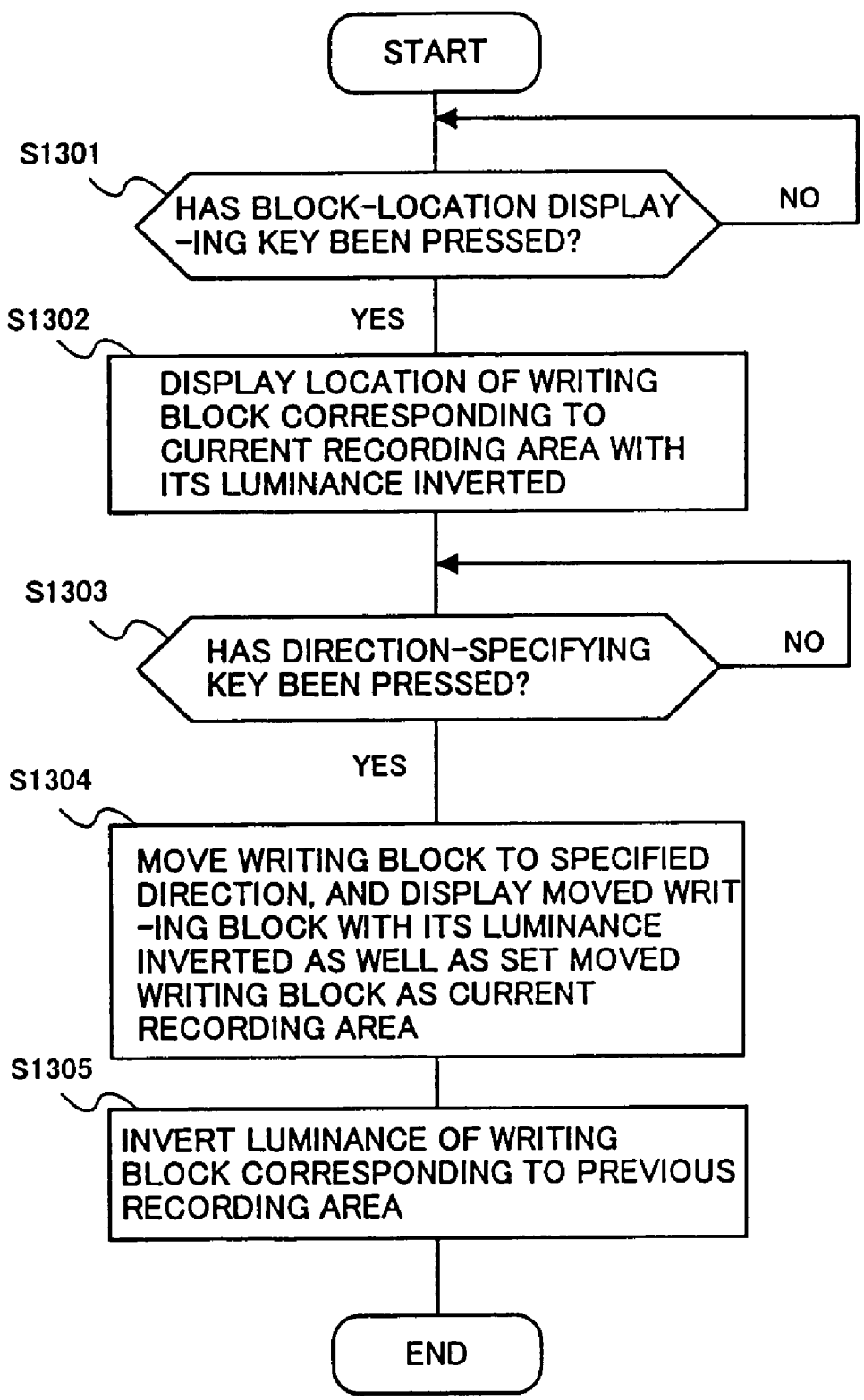
FIG. 35 is a flowchart describing steps performed by the writing input device according to a seventeenth embodiment of the present invention.
Figure 36:
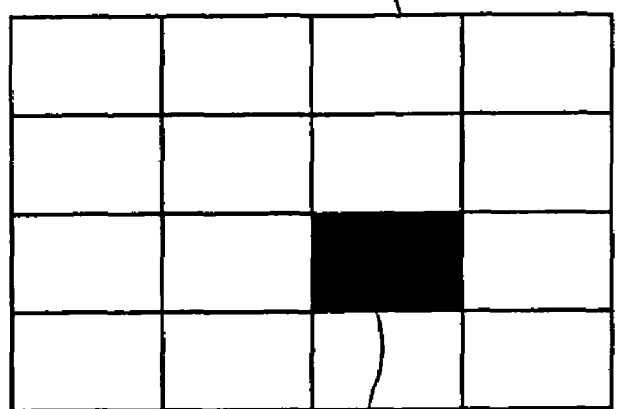
FIG. 36 is a diagram showing the writing block shown in FIG. 34 after being moved by use of a direction-specifying key.

A description will now be given of a seventeenth embodiment of the present invention. In the seventeenth embodiment, writing data in any part of a page of a data area is enabled since any of writing blocks corresponding to a recording area can be selected, thereby improving operability of the writing input device 1. FIG. 35 is a flowchart describing steps performed by the writing input device according to the seventeenth embodiment of the present invention. In the seventeenth embodiment, a direction-specifying key including up, down, left and right buttons is provided in the operation unit 27. If it is determined at a step S1301 that the block-location displaying key has been pressed, a location of the writing block 58 (a writing block 10) is displayed on the LCD 8 with its luminance being inverted from other blocks in a page of the data area as shown in FIG. 34, at a step S1302. Subsequently, if it is determined at a step S1303 that the direction-specifying key has been pressed, the writing block 58 corresponding to the recording area is moved to a direction specified by use of the direction-specifying key, and is displayed with its luminance being inverted at a step S1304. For example, in a case that the writing block 10 shown in FIG. 34 corresponds to the writing block 58, a writing block corresponding to the recording area is set to a writing block 11 when the right button of the direction-specifying key is pressed once, and is displayed with its luminance being inverted. FIG. 36 shows the LCD 8 displaying that a writing block 59 corresponding to the recording area is moved from the writing block 10 to a writing block 11. Luminance of the writing block 59 before having been moved to the writing block 11 is inverted back to the original value at a step S1305.

According to the seventeenth embodiment, writing data in any part of a page of the data area is enabled since any of the writing blocks corresponding to the recording area can be selected, thereby improving operability of the writing input device 1.

An eighteenth embodiment enables free movement of an area corresponding to the recording area in a page of a data area, and thus simplifies writing data in any part of a page of the data area, thereby improving operability of the writing input device 1. The direction-specifying key is used for selecting a writing block in the seventeenth embodiment. On the other hand, the direction-specifying key is used for moving the pixel-displaying area 53 and the displaying area 54 for writing by a pixel in the eighteenth embodiment. The pixel-displaying area 53 of the LCD 8 and the displaying area 54 for writing that corresponds to the recording area in the pixel-displaying area 53 are shown in FIG. 31. When the direction-specifying key is pressed, the pixel-displaying area 53 or the displaying area 54 for writing is moved by a fixed number of pixels to a direction specified by use of the direction-specifying key. The operation unit 27 additionally includes a moving-area selecting key used for selecting either the pixel-displaying area 53 or the displaying area 54 for writing as an object of moving. By use of the moving-area selecting key, one of the pixel-displaying area 53 and the displaying area 54 for writing is selected and is moved to the direction specified by use of the direction-specifying key.

Figure 37:
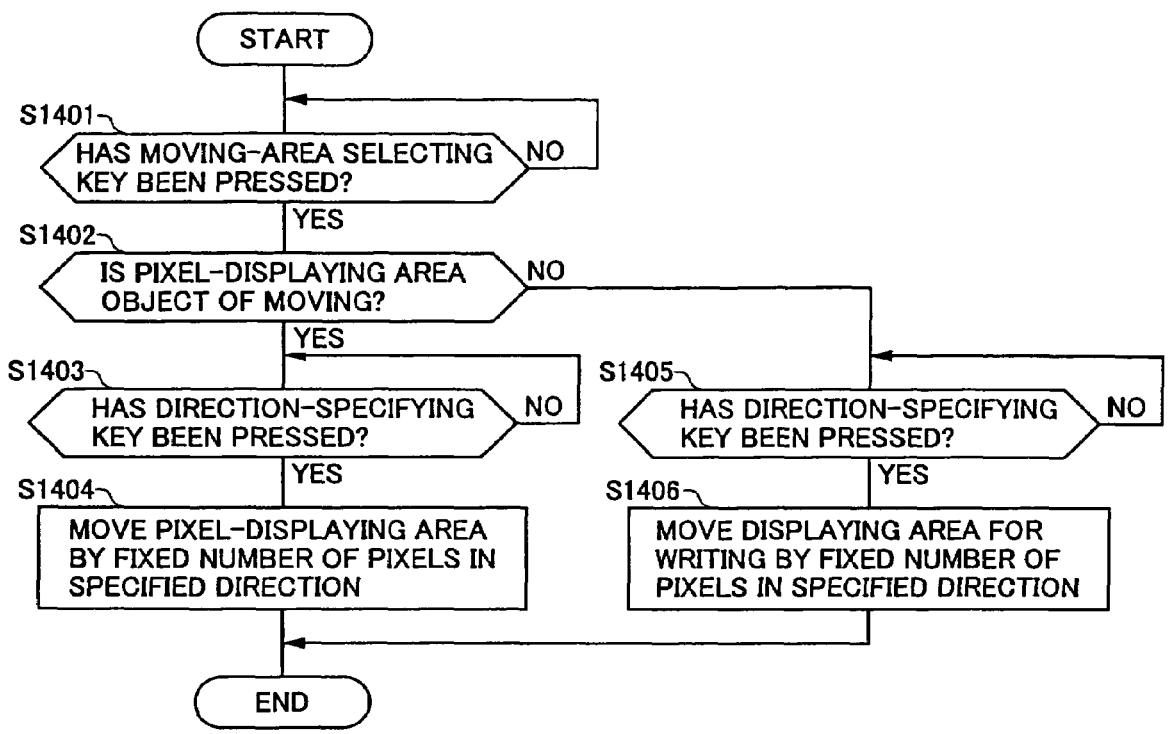
FIG. 37 is a flowchart describing steps performed by the writing input device according to an eighteenth embodiment of the present invention.

FIG. 37 is a flowchart describing steps performed by the writing input device according to the eighteenth embodiment of the present invention. A description will initially be given of a case of moving the pixel-displaying area 53 of the LCD 8. The LCD 8 can display an image having a size of a 432-pixel width by a 285-pixel length at most. A user initially selects one of the pixel-displaying area 53 and the displaying area 54 for writing by use of the moving-area selecting key, followed by pressing the direction-specifying key to move the selected area. The writing input device 1 checks whether the moving-area selecting key has been pressed at a step S1401. If the writing input device 1 determines at the step S1401 that the moving-area selecting key has been pressed, the writing input device 1 proceeds to a step S1402, and checks whether a selected area is the pixel-displaying area 53 of the LCD 8. If it is determined at the step S1402 that the pixel-displaying area 53 has been selected, the writing input device 1 further checks whether the direction-specifying key has been pressed at a step S1403. If it is determined at the step S1403 that the direction-specifying key has been pressed, a desired area (the pixel-displaying area 53) in a page of the data area is displayed on the LCD 8 after being moved in a direction specified by use of the direction-specifying key, at a step S1404.

Figure 38:
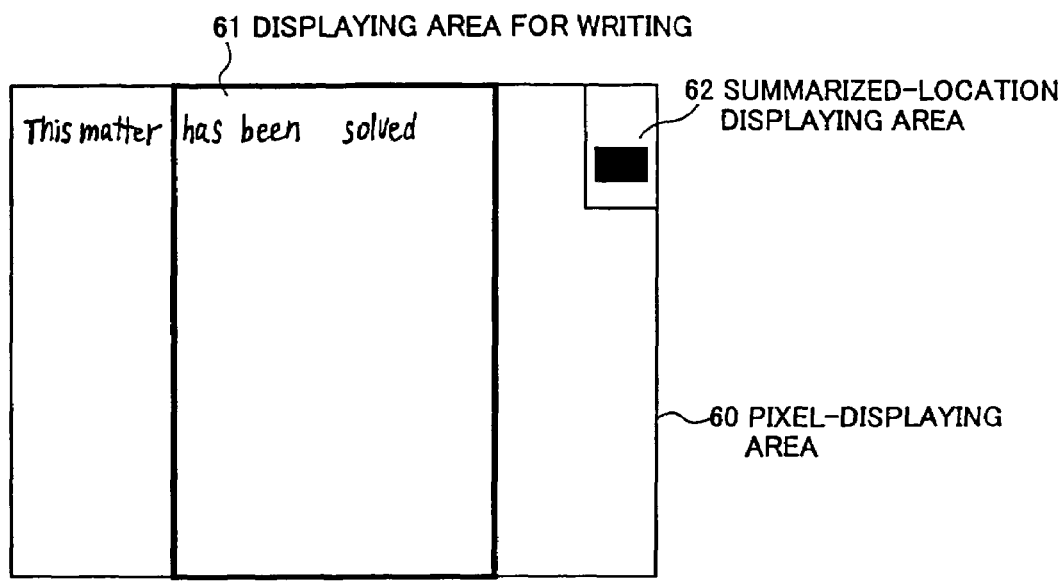
FIG. 38 is a block diagram showing the pixel-displaying area and a summarized location of the pixel-displaying area in a page of the data area.

FIG. 38 is a diagram showing an embodiment of a pixel-displaying area 60 displayed on the LCD 8. In FIG. 38, a displaying area 61 for writing that corresponds to the recording area is displayed at the center of the pixel-displaying area 60. The pixel-displaying area 60 displayed on the LCD 8 additionally includes a summarized-location displaying area 62 at a top right corner thereof in which a location of the pixel-displaying area 60 in a page of the data area is displayed. The summarized-location displaying area 62 takes a format of a reduced image of a diagram shown in FIG. 34, for example. The pixel-displaying area 60 shown in FIG. 38 further includes a series of letters already written on in the upper area thereof.

Figure 39:
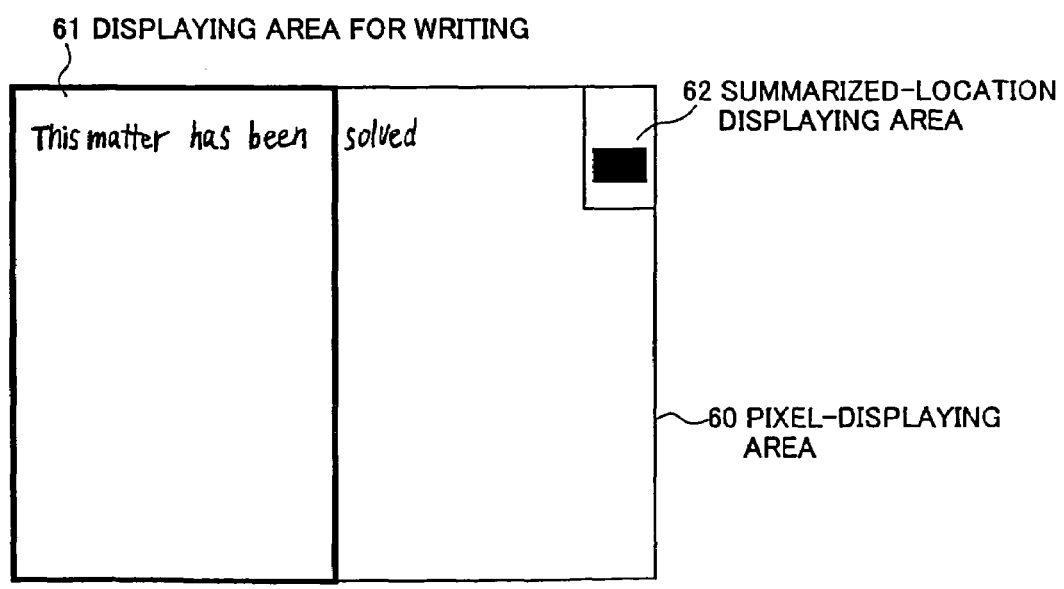
FIG. 39 is a block diagram showing the displaying area for writing after being moved from a position shown in FIG. 38 to a left edge of the pixel-displaying area by use of the direction-specifying key.

A description will now be given of a case of moving the displaying area 61 for writing in the pixel-displaying area 60. It should be noted that the pixel-displaying area 53 corresponds to the pixel-displaying area 60. In addition, the displaying area 54 for writing corresponds to the displaying area 61 for writing. The writing input device 1 initially checks whether the moving-area selecting key has been pressed at the step S1401 of FIG. 37. If the writing input device 1 determines at the step S1401 that the moving-area selecting key has been pressed, the writing input device 1 proceeds to the step S1402, and checks whether a selected area is the pixel-displaying area 60 of the LCD 8. If it is determined at the step S1402 that the displaying area 61 for writing has been selected instead of the pixel-displaying area 60, the writing input device 1 further checks whether one of the up, down, left and right buttons of the direction-specifying key has been pressed at a step S1405. If it is determined at the step S1405 that the one of the buttons has been pressed, at a step S1406, the writing input device 1 moves a frame on the LCD 8 indicating the displaying area 61 for writing by 30 pixels to a direction specified by use of the direction-specifying key, and again displays the displaying area 61 for writing at a new location. In a case that an instruction to move the displaying area 61 for writing to the right (left) has been inputted when the number of pixels remaining on the right (left) side of the displaying area 61 in the pixel-displaying area 60 is less than 30 pixels, the displaying area 61 is moved by the number of pixels remaining. FIG. 39 is a diagram showing the displaying area 61 for writing that has been moved to the left edge of the pixel-displaying area 60 from the position shown in FIG. 38 by the left button of the direction-specifying key being pressed for four times.

According to the eighteenth embodiment, an area corresponding to the recording area can be moved freely in a page of the data area, thereby improving operability of the writing input device 1.

A description will now be given of a nineteenth embodiment of the present invention. In a case of using a lens for the left camera unit 2 and the right camera unit 3, a larger distance from one of the left camera unit 2 and the right camera unit 3 produces a lower resolution of reading coordinates. Thus, the nineteenth embodiment provides a method of preventing deterioration of an image caused by lack of written data by executing an interpolation process against the written data in an area where the resolution of reading coordinates is low. Additionally, the nineteenth embodiment provides a method of making pixel density and image quality of written data obtained by a writing implement moving a certain distance substantially even throughout the entire recording area, by executing an interpolation process or a decimation process properly based on a resolution of reading coordinates at a writing position of the writing implement.

In the nineteenth embodiment, the writing input device 1 manages a page of written data in the number of pixels corresponding to 100 dpi, that is, the 864-pixel width by the 1140-pixel length. Since the size of the recording area corresponds to ⅟16 of the size of a page of the written data as shown in FIG. 28, coordinates of the writing position are desirably read at 25 dpi in the recording area.

In a case that the number of pixels read by a CMOS image sensor provided in each camera unit in the horizontal direction (a direction parallel to a recording surface of an image photographed by each camera unit) is 640 pixels, the resolution of reading coordinates at the points R and S in the A4-sized recording area shown in FIG. 23 is about 28 dpi. Additionally, the resolution of reading coordinates at the center of the recording area is about 56 dpi. In other words, the closer to the left camera unit 2 and the right camera unit 3 the writing position is, the more densely coordinates of the writing position are read by the CMOS image sensors 16 and 21. On the contrary, the farther from the left camera unit 2 and the right camera unit 3 the writing position is, the more roughly the coordinates of the writing position are read by the CMOS image sensors 16 and 21. However, a resolution of reading coordinates throughout the entire recording area only needs to be higher than 25 dpi. Thus, the decimation process is executed on the written data, that is, a series of coordinates of the writing position, throughout the entire recording area. The closer to the left camera unit 2 and the right camera unit 3 the writing position of the writing implement is, the higher the resolution of reading coordinates is. Thus, the closer to the left camera unit 2 and the right camera unit 3 the writing position is, the higher a rate of decimation should be. On the other hand, the farther from the left camera unit 2 and the right camera unit 3 the writing position is, the lower the resolution of reading coordinates is. Thus, the farther from the left camera unit 2 and the right camera unit 3 the writing position is, the lower the rate of decimation should be. Written data whose size is adapted to ⅟16 of the size of a page (216 pixels by 285 pixels) is obtained because of the above-described execution of the decimation processes.

Figure 40:
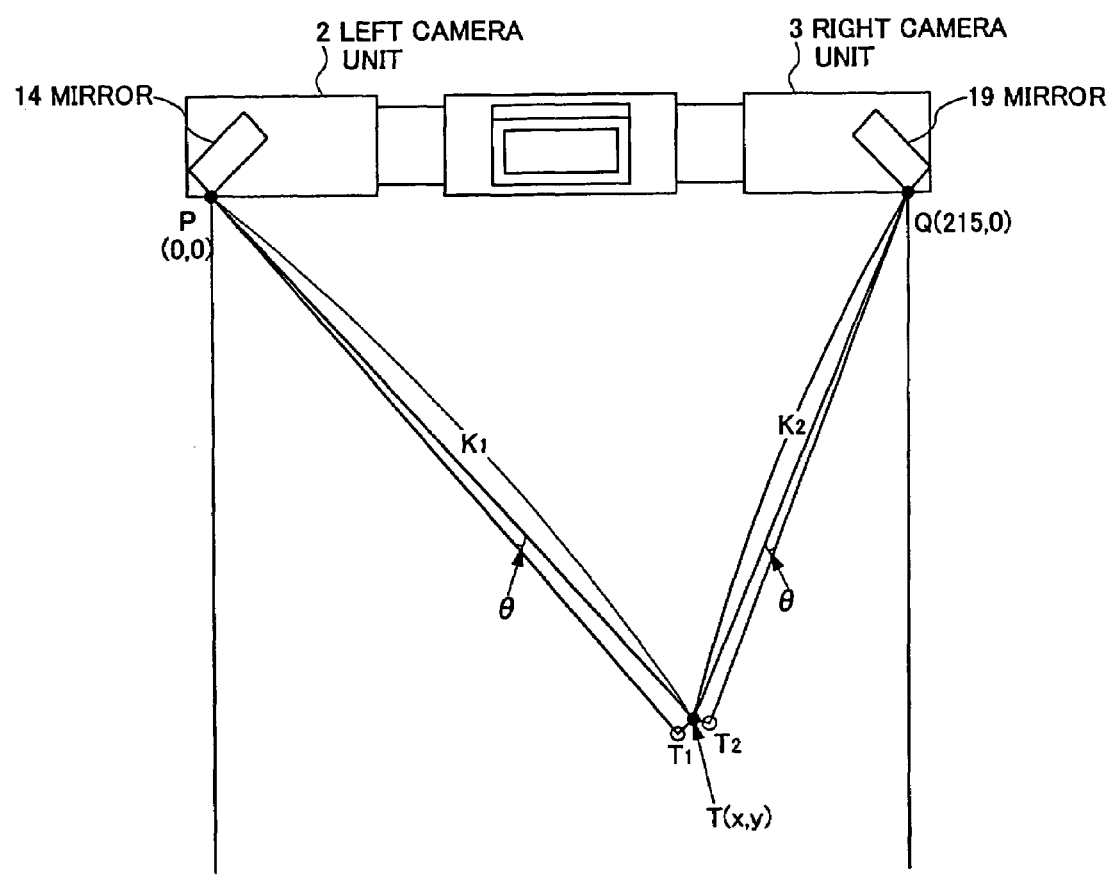
FIG. 40 is a diagram used for describing a method of calculating a resolution of reading coordinates in the recording area.

A description will now be given of a method of calculating a resolution of reading coordinates in the recording area. FIG. 40 is a diagram used for describing a method of calculating the resolution of reading coordinates at a point T in the recording area. FIG. 40 shows the left camera unit 2, the right camera unit 3, the mirror 14 and the mirror 19. An image of a writing implement located at the point T is obtained by light reflected at around the center of the mirrors 14 and 19. However, it is assumed that the centers of the wide-angle lenses 15 and 20 are located respectively at points P and Q that are corners of the recording area for the purpose of simplifying the description. Coordinates of the points P and Q are respectively (0, 0) and (215, 0) since a line PQ is a width of an A4-sized recording area.

A point Ti is provided in the recording area so that image-formed locations of the points T and T1 are at pixels adjacent to each other on the CMOS image sensor 16 of the left camera unit 2. Similarly, a point T2 is provided in the recording area so that image-formed locations of the points T and T2 are at pixels adjacent to each other in the CMOS image sensor 21 of the right camera unit 3. An angle θ corresponds to a photographing range of each pixel on the CMOS image sensors 16 and 21, and depends on a view angle of each of the left camera unit 2 and the right camera unit 3. Lengths of lines PT, QT, TT1 and TT2 are named k1, k2, L1 and L2 respectively. An angle formed by lines PT1 and TT1, and an angle formed by lines QT2 and TT2 are set to 90 degrees. In addition, coordinates of the point T are set to (x, y). Accordingly, values of lengths k1 and k2 are obtained as follows.

$$k1=\sqrt{(x^2+y^2)} \qquad \text{EQ15}$$

$$k2=\sqrt{((215-x)^2+y^2)} \qquad \text{EQ16}$$

Subsequently, values of lengths L1 and L2 can be obtained from the following equations.

$$L1=k1*\sin\theta \qquad \text{EQ17}$$

$$L2=k2*\sin\theta \qquad \text{EQ18}$$

The coordinates (x, y) of the point T obtained from the equations EQ1 through EQ4 are expressed in millimeters so that the lengths L1 and L2 obtained from the equations EQ17 and EQ18 are expressed also in millimeters. Thus, a unit of the lengths L1 and L2 should be converted from a millimeter to an inch by use of a fact that one-millimeter is equal to about 0.03937 inch. Subsequently, a resolution Rdiv_L of reading coordinates by the left camera unit 2 and a resolution Rdiv_R of reading coordinates by the right camera unit 3 at the point T are obtained respectively by dividing one inch by the length L1 expressed in inches and by the length 2 expressed in inches.

$$Rdiv\_L=1/(L1\times0.03937) \qquad \text{EQ19}$$

$$Rdiv\_R=1/(L2\times0.03937) \qquad \text{EQ20}$$

Since the point T is provided in the recording area so that the value of k1 is greater than the value of k2 as shown in FIG. 40, the value of L1 obtained from the equation EQ17 is greater than the value of L2 obtained from the equation EQ18. Thus, the value of the resolution Rdiv_R obtained from the equation EQ20 is greater than the value of the resolution Rdiv_L obtained from the equation EQ19.

$$Rdiv\_R > Rdiv\_L \qquad \text{EQ21}$$

As seen in the equation EQ21, the resolution of reading coordinates by the right camera unit 3 is higher than the resolution of reading coordinates by the left camera unit 2.

Figure 41A:
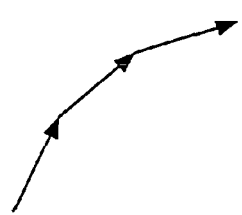
FIGS. 41A and 41B are diagrams showing directions of writing data.
Figure 41B:
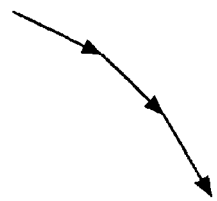

As described above, the resolution of reading coordinates by the left camera unit 2 is different from the resolution of reading coordinates by the right camera unit 3 at any point except a point where the values of k1 and k2 are identical. Accordingly, the writing input device 1 calculates a vector between each coordinate data belonging to a series of the coordinate data, and decides to use one of resolutions of reading coordinates by the left camera unit 2 and by the right camera unit 3 based on a direction of the vector between each set of coordinates, for executing the decimation process on written data. For example, the resolution of reading coordinates by the left camera unit 2 is used when a user is writing data in a top-right direction as shown in FIG. 41A. On the other hand, the resolution of reading coordinates by the right camera unit 3 is used when the user is writing data in a bottom-right direction. Similarly, the resolution of reading coordinates by the right camera unit 3 is used when the user is writing data in a top-left direction. The resolution of reading coordinates by the left camera unit 2 is used when the user is writing data in a bottom-left direction.

Figure 42:
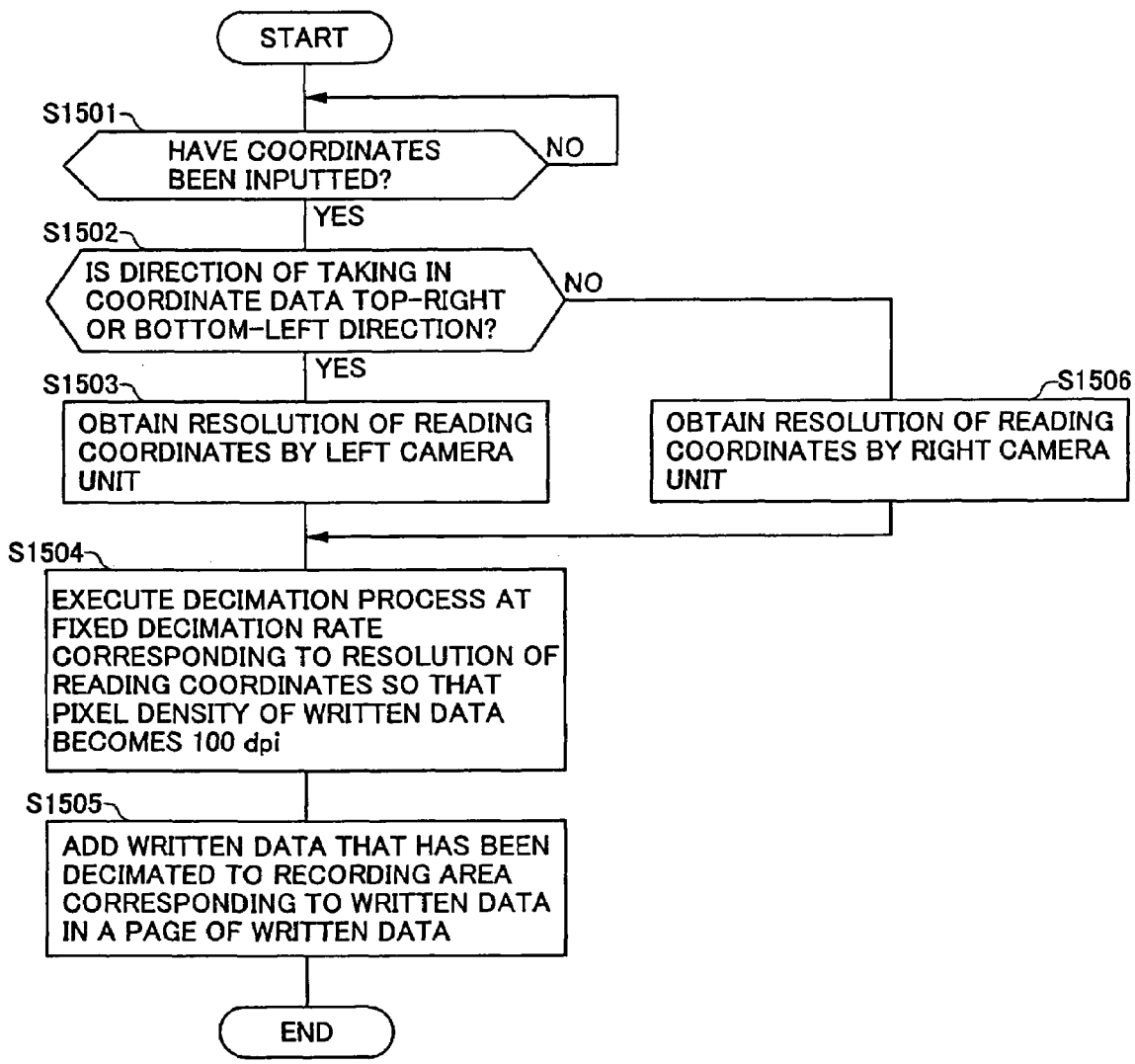
FIG. 42 is a flowchart describing steps performed by the writing input device according to a nineteenth embodiment of the present invention.

FIG. 42 is a flowchart describing steps performed by the writing input device according to the eighteenth embodiment of the present invention. The writing input device 1 initially checks whether coordinates have been inputted to the recording area at a step S1501. If it is determined at the step S1501 that the coordinates have been inputted to the recording area, the writing input device 1 inspects a direction of taking in coordinate data at a step S1502. If the direction of taking in coordinate data is the top-right or bottom-left direction, the writing input device 1 obtains the resolution of reading coordinates by the left camera unit 2 at a step S1503. If the direction of taking in coordinate data is the bottom-right or top-left direction, the writing input device 1 obtains the resolution of reading coordinate data by the right camera unit 3 at a step S1506. At a step S1504 following the steps S1503 and S1506, the writing input device 1 executes the decimation process on written data inputted thereto at a fixed rate of decimation that corresponds to the resolution of reading coordinates by a camera unit selected at the step S1502 so that a pixel density of the written data becomes 100 dpi. Subsequently, at a step S1505, the writing input device 1 adds the written data that has been decimated at the step S1504 to a recording area that corresponds to the written data in a page of written data as shown in FIG. 29. In a case that there is a data-storing operation, the writing input device 1 stores a renewed page as a file in the flash memory 26. It should be noted that a resolution of reading coordinates during a data-writing process in the recording area varies according to coordinates of the writing position. Accordingly, the entire recording area may be equally divided into a plurality of areas, wherein a resolution of reading coordinates in each area may be set to a single value, for example, a value at the center of the area.

A description will now be given of a method of executing an interpolation process on written data. The above-described processes shown in FIG. 42 may be applied to an interpolation process instead of a decimation process. In such case, the writing input device 1 obtains a vector between each set of coordinates of written data, and decides which of the left camera unit 2 or the right camera unit 3 is to be used for calculating a resolution of reading coordinates. In this method of executing an interpolation process on written data, the writing input device 1 manages a page of written data in a size of a 1728-pixel width by a 2280-pixel length, which corresponds to 200 dpi. Since the size of the recording area is 1/16 of a page of the written data, the writing input device 1 needs to read coordinates of a writing position at 50 dpi that is 1/4 of the resolution of a page of the written data. However, in a case that the number of pixels read by the CMOS image sensors 16 or 21 in the horizontal direction is 640 pixels, the resolution of reading coordinates at the points R and S in the A4-sized recording area shown in FIG. 23 is about 28 dpi so that the CMOS image sensors 16 and 21 cannot read the coordinates of the points R and S at 50 dpi.

Accordingly, the writing input device 1 generates written data at 50 dpi by executing the interpolation process on written data, that is, a series of coordinates read by the CMOS image sensors 16 and 21, in a case that the resolution of reading coordinates is lower than 50 dpi. A spline-curve method and a Bezier-curve method are used in the interpolation process executed on the written data. The spline-curve method is a method of interpolating coordinates at a fixed interval on a curve after obtaining the curve that includes all the coordinates obtained by the CMOS image sensors 16 and 21 thereon. The Bezier-curve method is a method of interpolating coordinates at a fixed interval on a curve after obtaining the curve that includes first and last coordinates provided in a series of coordinates of a writing position thereon by using coordinates located between the first and last coordinates only for deciding a shape of the curve. In other words, the first and last coordinates are on a Bezier curve. However, other coordinates located between the first and last coordinates are not necessarily on the Bezier curve. As described above, the writing input device 1 executes the interpolation process on written data in a case that a resolution of reading coordinates is less than 50 dpi according to the writing position. Alternatively, the writing input device 1 executes the decimation process on written data in a case that a resolution of reading coordinates is higher than 50 dpi. Subsequently, the writing input device 1 adds the written data having its pixel density being 200 dpi to a recording area corresponding to the written data in a page of written data.

Figure 43:
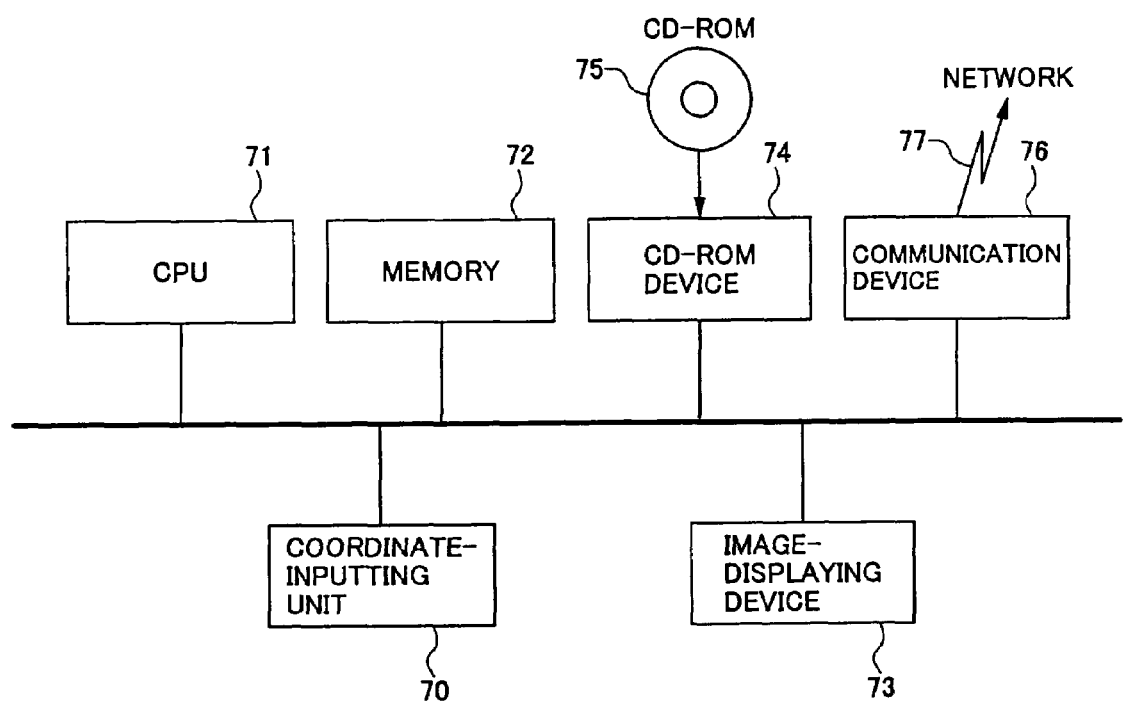
FIG. 43 is a block diagram showing a system wherein the present invention is implemented by use of software.

A description will now be given of a twentieth embodiment of the present invention. The twentieth embodiment provides a method of implementing the present invention by use of software. FIG. 43 is a block diagram showing a system wherein the present invention is implemented by use of software. The system shown in FIG. 43 includes a coordinate-inputting unit 70, a CPU 71, a memory 72, an image-displaying device 73, a CD-ROM device 74, a CD-ROM 75, and a communication device 76. The coordinate-inputting unit 70 includes the left camera unit 2 and the right camera unit 3 shown in FIG. 3. The CPU 71 executes the steps and functions that have been described in each of the previous embodiments on an image photographed by the left camera unit 2 and the right camera unit 3. Subsequently, the CPU 71 displays depiction data on the image-displaying device 73, and stores written data in the memory 72. A program executing the above-described processes is stored in a recording medium such as the CD-ROM 75. The program stored in the recording medium is read by the CD-ROM device 74, and is installed in the system, thereby executing the functions described in the above-described embodiments. The program may be supplied to the system by being downloaded from a server and the like through the communication device 76 and a network 77.

As described above, the present invention enables use of a desired writing implement and a desired recorded material whose recording surface is a plane for a writing input device. Additionally, according to the present invention, the writing input device can record data in a recording medium in real time while the data is being written by use of a writing implement on the recording surface. Additionally, the writing input device can create and manage a page of written data by dividing the page into a plurality of areas, and then by assigning each of the areas to a recording area even in a case that a resolution of reading coordinates is low in the recording area. Additionally, the writing input device can control a pixel density of the written data to be even throughout the entire recording area. Furthermore, the writing input device can control displaying the recording area on a LCD for improving operability of writing data in the recording area.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 11-369699, filed on Dec. 27, 1999, the entire contents of which are hereby incorporated by reference.

What is claimed is:

1. A method of inputting information comprising the steps of:
    extracting an object located on a plane from an image that includes the plane and the object;
    determining whether the object is a writing implement;
    calculating a position of a contact point between the writing implement and the plane as information to be input if the object has been determined as the writing implement; and
    inputting the information representing a position on the plane indicated by the object,
    wherein when a plurality of objects are extracted from the image, one of the plurality of objects that satisfies a prescribed condition is determined as the writing implement, and the contact position of the writing implement is input as the information.

2. The method as claimed in claim 1, comprising the step of:
    observing movement of the writing implement approaching the plane if the object has been recognized as the writing implement; and
    inputting the contact position of the writing implement on the plane as the information when the writing implement has stopped in a perpendicular direction to the plane.

3. The method as claimed in claim 1, comprising the step of recognizing whether the object is the writing implement by comparing a shape of the object with a specific shape that has been selected from a plurality of specific shapes in advance.

4. The method as claimed in claim 1, comprising the step of recognizing whether the object is the writing implement by comparing a shape of the object with a registered shape of the object.

5. The method as claimed in claim 1, wherein the contact position that satisfies the prescribed condition is the contact position located at a shortest distance from a fixed point on the plane among distances from the fixed point to each of the plurality of the contact positions.

6. The method as claimed in claim 1, comprising the step of inputting the contact position as valid information if the contact position is located in a fixed area on the plane.

7. The method as claimed in claim 6, wherein the fixed area is an area selected from a plurality of areas whose shapes and sizes are different from each other.

8. The method as claimed in claim 6, wherein the fixed area is an area that can be set to a fixed shape.

9. The method as claimed in claim 8, wherein said area is one of a closed area formed by a track of the contact position of the writing implement on the plane and an area formed by said track and a width of a predetermined area.

10. The method as claimed claim 1, comprising the step of defining the contact position as invalid information as well as notifying of the invalid information if the contact position is not located in a fixed area.

11. A method of inputting information comprising:
    extracting an object located on a plane from an image that includes the plane and the object;
    determining whether the objected is a writing implement; and
    calculating and inputting a position of a contact point between the writing implement and the plane as position information representing a designated position on the plane and represented by two-dimensional coordinates if the object is recognized as the writing implement,
    wherein when a plurality of objects are extracted from the image, one of the plurality of objects that satisfies a prescribed condition is determined as the writing implement, and the contact position of the writing implement is input as the position information.

12. The method according to claim 1, further comprising:
    displaying the image based on the information.

13. The method according to claim 11, further comprising:
    displaying the image based on the locus information.

14. A method of inputting information comprising the steps of:
    extracting an object located on a plane from an image that includes the plane and the object;

recognizing whether the object is a writing implement; and calculating a position of a contact point between the writing implement and the plane as information to be input and representing an indicated position on the plane using two-dimensional coordinates if the object has been recognized as the writing implement, wherein when a plurality of objects are extracted from the image, one of the plurality of objects that satisfies a prescribed condition is determined as the writing implement, and the contact position of the writing implement is input as the position information.

15. An information-inputting device comprising:

a plurality of photographing units configured to photograph an area on a plane;

an object-recognizing unit configured to extract an object located on the plane from a photographed image and to recognize whether the extracted object is a writing implement; and a location-calculating unit configured to calculate a position of a contact point between the writing implement and the plane from the photographed image if the object has been recognized as the writing implement, wherein when a plurality of objects are extracted from the image, one of the plurality of objects that satisfies a prescribed condition is determined as the writing implement, and the contact position of the writing implement is calculated as the contact point.

* * * * *